(12) United States Patent
Babakhani et al.

(10) Patent No.: US 8,073,392 B2
(45) Date of Patent: Dec. 6, 2011

(54) TRANSMITTER ARCHITECTURE BASED ON ANTENNA PARASITIC SWITCHING

(75) Inventors: Aydin Babakhani, Pasadena, CA (US); David B. Rutledge, Pasadena, CA (US); Seyed Ali Hajimiri, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 1069 days.

(21) Appl. No.: 11/744,278

(22) Filed: May 4, 2007

(65) Prior Publication Data

US 2007/0259632 A1 Nov. 8, 2007

Related U.S. Application Data

(60) Provisional application No. 60/797,792, filed on May 4, 2006.

(51) Int. Cl.
*H04B 1/00* (2006.01)
*H04B 15/00* (2006.01)

(52) U.S. Cl. ............... 455/63.4; 455/129; 455/562.1; 455/575.5; 455/107; 455/121; 455/122; 455/123; 375/295

(58) Field of Classification Search .......... 375/295; 455/129, 63.4, 562.1, 575.5, 107, 121, 122, 455/123
See application file for complete search history.

(56) References Cited

U.S. PATENT DOCUMENTS

| | | |
|---|---|---|
| 4,075,632 A | 2/1978 | Baldwin et al. |
| 4,571,594 A * | 2/1986 | Haupt ......................... 343/840 |
| 5,670,959 A * | 9/1997 | Nagura et al. .................. 342/6 |
| 6,975,229 B2 | 12/2005 | Carrender et al. |
| 7,558,555 B2 * | 7/2009 | Nagy ......................... 455/277.1 |
| 2001/0000959 A1 * | 5/2001 | Campana, Jr. ............. 340/573.1 |
| 2002/0128052 A1 | 9/2002 | Neagley et al. |
| 2004/0043747 A1 * | 3/2004 | Forster ......................... 455/334 |
| 2005/0182597 A1 | 8/2005 | Hilliard et al. |
| 2006/0133338 A1 * | 6/2006 | Reznik et al. ................ 370/338 |

FOREIGN PATENT DOCUMENTS

EP 1 630 969 A 3/2006

(Continued)

OTHER PUBLICATIONS

D. Rutledge, IEEE Antennas and Propagation Society Newsletter, pp. 4-8, Aug. 1985.

(Continued)

*Primary Examiner* — Wen Huang
(74) *Attorney, Agent, or Firm* — Milstein Zhang & Wu LLC; Joseph B. Milstein

(57) ABSTRACT

The invention is a radio transmitter that includes an antenna having at least one driven element and at least one reflector element. The driven element is electrically coupled to a radio carrier source. At least one of the driven elements or the at least one reflector element, includes at least one switch to modulate the radio carrier. Also, a secure communication system includes a radio transmitter configured to transmit a modulated signal within an information beam width. Also, a method for modulating a radio signal includes the steps of causing the transmitted carrier signal to be modulated by the modulation signal in response to switching the at least one reflector switch. Also, a method for selecting desirable antenna reflector switch combinations includes performing a mathematical simulation to determine whether the combination of reflector switch positions results in a modulated signal that can be demodulated within an information beam width.

26 Claims, 38 Drawing Sheets

FOREIGN PATENT DOCUMENTS

WO       WO 00/67373 A     11/2000

OTHER PUBLICATIONS

D.F. Filipovic, G.P. Gauthier, S. Raman, and G.M. Rebeiz, "Off-Axis Properties of Silicon and Quartz Dielectric Lens Antennas", IEEE Trans. Antennas and Propagation, vol. 45, No. 5, pp. 760-766, May 1997.

A. Babakhani, X. Guan, A. Komijani, A Natarajan, and A. Hajimiri, "A 77-GHz Phased-Array Transceiver With On-Chip Antennas in Silicon: Receiver and Antennas", IEEE Journal of Solid-State Circuits, vol. 41, No. 12, pp. 2795-2806, Dec. 2006.

* cited by examiner (θ=0 deg.)

(θ=0.86 deg.)

(θ=1.7 deg.)

(θ=2.6 deg.)

Gain = Directivity × Efficiency $$G_{t_2} = \left(\frac{G_{t_1} P_{t_1}}{V_{r_1}^2}\right) \frac{V_{r_2}^2}{P_{t_2}} = \alpha_0 \frac{V_{r_2}^2}{P_{t_2}}$$

$G_t$ = Gain of the Transmitting Antenna
$G_r$ = Gain of the Receiving Antenna
$V_t$ = Voltage of the Transmitting Antenna
$V_r$ = Voltage of the Receiving Antenna $$P_{r_2} = \frac{P G_{t_2} G_r \lambda^2}{(4\pi d)^2}$$

$$P_{r_1} = \frac{P G_{t_1} G_r \lambda^2}{(4\pi d)^2}$$

TRANSMITTER ARCHITECTURE BASED ON ANTENNA PARASITIC SWITCHING

CROSS-REFERENCE TO RELATED APPLICATIONS

This application claims priority to and the benefit of U.S. provisional patent application Ser. No. 60/797,792, filed May 4, 2006 entitled "A New Transmitter Architecture Based on Antenna Parasitic Switching," the disclosure of which application is incorporated herein by reference in its entirety.

FIELD OF THE INVENTION

The invention relates to radio modulation in general and particularly to a radio transmitter that employs a highly efficient modulation method and apparatus.

BACKGROUND OF THE INVENTION

Radio transmitters convey information by encoding or "modulating" the information onto a radio "carrier" wave. Modulation of the carrier wave can take on many forms. Some types of modulation vary only the phase or frequency of the carrier wave. Other types of modulation vary the amplitude of the carrier wave resulting in a "non-constant envelope" modulation. The modulation information can be analog or digital and can be described as a "baseband" signal typically at a frequency lower than that the frequency of the carrier wave. Once modulated by one or more baseband signals, the modulated carrier wave is typically amplified by a power amplifier ("PA") and transmitted, such as into free space, by a radio antenna.

A number of problems in conventional radio transmitter modulation techniques have been observed. For example, in a conventional transmit architecture of the prior art, baseband data are up-converted to a RF frequency by using a mixer and an oscillator. To achieve high data rate transmission, a high bandwidth signal needs to pass through the entire signal path which includes the up-conversion mixer and the PA. Also, non-constant envelope higher order modulations need to be used to achieve this high data rate. The up-conversion mixer and the PA need to be wide-band and at a same time very linear because of the requirements of non-constant envelope modulations. However, using a linear PA significantly reduces the PA power efficiency, a very important factor in any transmitter. Also, in conventional radio transmitter designs, there is a strong trade-off between high order non-constant envelope modulations and the transmitter power efficiency.

Another problem with conventional radio transmitter operation is that any receiving station that can receive enough power from the radio transmitter can generally demodulate the received carrier wave and have access to the modulation information. Some level of secure communications can be achieved by various encryption schemes. However, even with encryption of the information, there is always a risk that an unintended recipient might successfully decode the encrypted information.

There is a need for a transmitter architecture that can more efficiently modulate and transmit modulated radio carrier waves. There is also a need for a radio transmitter that can transmit modulated signals that can only be demodulated by an intended recipient radio receiver to which the transmitted signal has been directed.

SUMMARY OF THE INVENTION

In one aspect, the invention relates to a radio transmitter for transmitting a modulated signal including a radio carrier source that generates a radio carrier signal. The radio carrier source is powered by an electrical power source. The radio transmitter also includes an antenna including at least one driven element and at least one reflector element, the driven element electrically coupled to the radio carrier source. At least one of the driven elements or the at least one reflector element, includes at least one switch, wherein the radio transmitter is configured to transmit a signal having a first modulation state in response to an open state of the at least one switch and is configured to transmit a signal having a second modulation state in response to a closed state of the at least one switch.

In one embodiment, the radio carrier source further includes a power amplifier, the power amplifier electrically coupled between the radio carrier source and the antenna.

In another embodiment, the transmitted modulated radio signal is recoverable only within an information beam width.

In yet another embodiment, the transmitted modulated radio signal includes multiple information beam widths.

In yet another embodiment, the transmitter is configured to transmit the same baseband modulation within the multiple information beam widths.

In yet another embodiment, the transmitter is configured to transmit a first baseband modulation within a first one of the multiple information beam widths and to transmit a second baseband modulation within a second one of the multiple information beam widths.

In yet another embodiment, a transmission situated within the information beam width includes a secure communication.

In yet another embodiment, a modulation constellation corresponding to a digital modulating signal includes a transmission with a symbol error rate that is substantially near zero within the information beam width.

In yet another embodiment, the digital modulating signal includes a digital modulation selected from the group of digital modulation schemes consisting of m-QAM, m-PSK, PAM-PSK, Multi-amplitude continuous phase modulation ("CPM"), and CPFSK.

In yet another embodiment, a plurality of reflector switches are configured to provide a plurality of reflector switch combinations that determine the information beam width.

In yet another embodiment, a plurality of reflector switches are configured to provide a plurality of reflector switch combinations that determine a constellation of points within the information beam width.

In yet another embodiment, a first plurality of reflector switches are configured to provide a first plurality of reflector switch combinations that determine the information beam width and wherein a second plurality of reflector switches are configured to provide a second plurality of reflector switch combinations that also determine the information beam width.

In yet another embodiment, the first plurality of reflector switch combinations and the second plurality of reflector switch combinations are configured to provide a first set of corrupted modulation points outside of the information beam width and a second set of corrupted modulation points outside of the information beam width, the first set of corrupted modulation points different from the second set of corrupted modulation points.

In yet another embodiment, each switch includes a transistor and an inductor, the inductor configured to resonate with a parasitic capacitance of the transistor when the switch is off.

In yet another embodiment, the at least one switch comprises a MEMS switch.

In yet another embodiment, a phased array antenna includes a plurality of transmitters, wherein a substantial portion of the transmitted power is situated within one or more information beam widths.

In yet another embodiment, the antenna further includes at least one hemispherical lens.

In yet another embodiment, the transmitter includes an integrated structure fabricated on a substrate.

In yet another embodiment, the transmitter structure includes SiGe.

In yet another embodiment, the radio transmitter further includes at least one mixer before the antenna.

In another aspect, the invention features a secure communication system including a radio transmitter configured to transmit a modulated signal within an information beam width. The secure communication system also includes a radio receiver configured to receive and to demodulate the modulated signal within the information beam width.

In another embodiment, the modulated signal outside of the information beam width is not amenable to successful demodulation.

In another aspect, a method for modulating a radio signal includes the steps of: providing a carrier signal; providing a modulation signal; providing an antenna including at least one driven element and a plurality of reflectors, at least some of the reflectors including at least one reflector switch; delivering the carrier signal to the at least one driven element; transmitting the carrier signal from the driven element; and causing the transmitted carrier signal to be modulated by the modulation signal in response to switching the at least one reflector switch.

In another aspect, a method for selecting desirable antenna reflector switch combinations, includes the steps of: a. providing a plurality of antenna reflectors, each antenna reflector including at least one of a plurality of reflector switches each reflector switch capable of having an open position and a closed position; b. randomly generating a set of reflector switch positions to be applied to the plurality of reflector switches as a combination; c. performing a mathematical simulation to determine whether the combination of reflector switch positions generated in step b results in a modulated signal that can be demodulated within an information beam width; and d. repeating steps b and c until a desired number of combinations are found that result in a modulated signal that can be demodulated within the information beam width.

In another embodiment, the step of performing a mathematical simulation includes performing a mathematical simulation to determine whether the set of reflector switch positions provides a modulated signal that can be demodulated within an information beam width and within a radius of a particular point on a digital modulation constellation.

In yet another embodiment, repeating steps b and c includes repeating steps b and c until a desired number of combinations for each point on the digital modulation constellation is found.

In yet another embodiment, the step c of performing a mathematical simulation includes performing a circuit analysis mathematical simulation to determine if the set of reflector switch positions provides a modulated signal that can be demodulated within an information beam width.

In yet another embodiment, the method further includes as a step between step b and step c the step of performing once an S-Parameter extraction using an electromagnetic field mathematical simulation, followed by repeating steps b and c, using a circuit analysis mathematical simulation in step c.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

Figure 1:
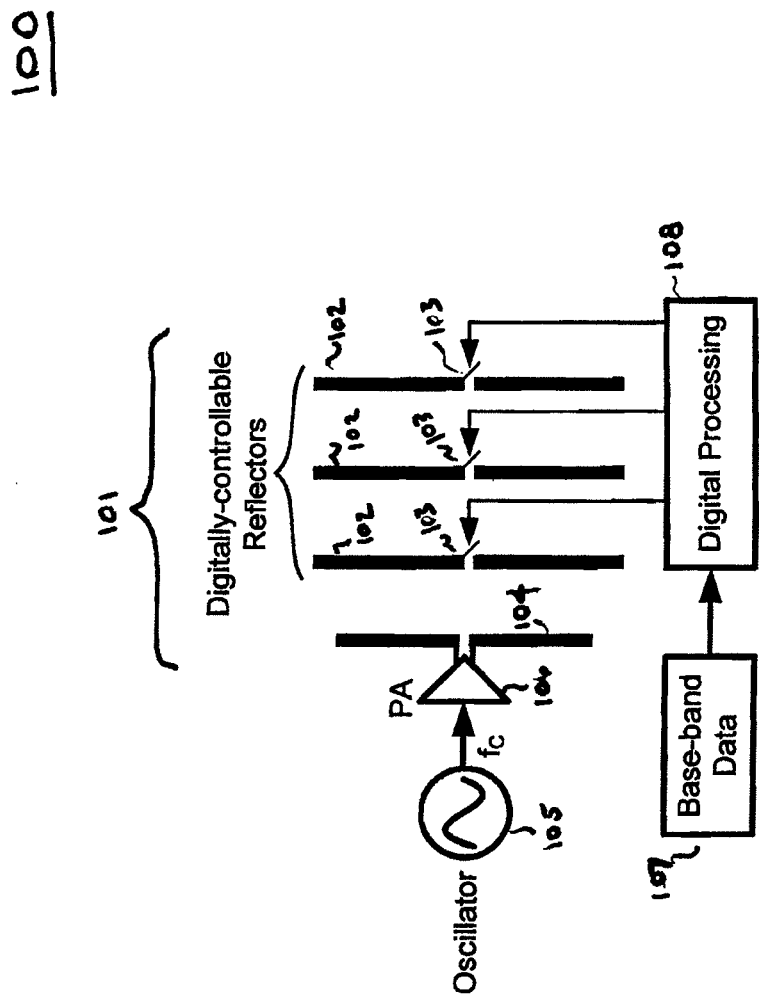
FIG. 1 illustrates an exemplary embodiment of a radio transmitter according to the invention.

FIG. 1 shows a block diagram of one exemplary embodiment of radio transmitter 100 according to the invention. Oscillator 105 generates a carrier signal at a carrier frequency $f_c$. PA 106 amplifies the carrier signal and feeds the amplified carrier signal to antenna 101. Exemplary antenna 101 includes a dipole (driven element) 104 and three reflector elements 102. Each reflector element 102 includes a switch 103. In the exemplary embodiment of FIG. 1, baseband information 107 further processed by digital processing block 108, operates switches 103 so as to modulate the carrier signal after the antenna.

Figure 2:
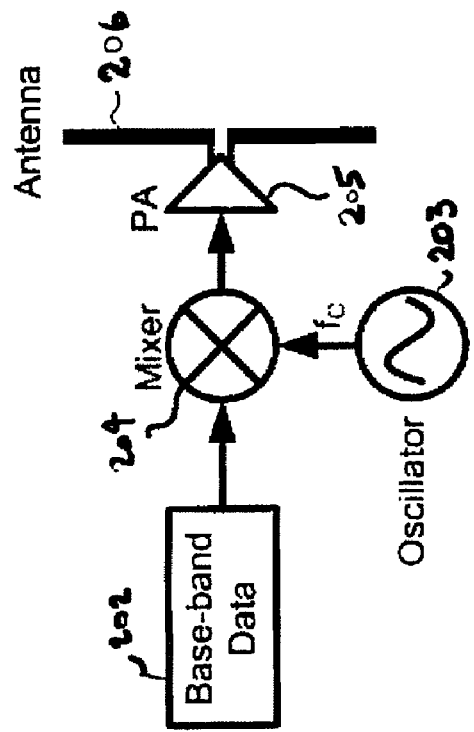
FIG. 2 illustrates a radio transmitter according to the prior art.

Next, we compare the inventive transmitter architecture to a typical radio transmitter 200 of the prior art, as shown in the block diagram of FIG. 2. In the conventional transmitter 200, mixer 204 modulates a carrier frequency $f_c$ provided by oscillator 203 with a baseband signal 202 comprising data. PA 205 amplifies the modulated signal and antenna 206 broadcasts the amplified modulated signal, such as into free space. When baseband signal 202 is a high data rate transmission, a high bandwidth signal needs to pass through the entire signal path which includes mixer 204 and the PA 205. A non-constant envelope higher order modulation is generally used to achieve the high data rate. Consequently, mixer 204 and the PA 205 need to be both wide band and very linear because of the requirements of non-constant envelope modulations. Using such a linear PA significantly reduces the PA power efficiency, a very important factor in any transmitter. Also, in conventional radio transmitter designs, there is a strong trade-off between high order non-constant envelope modulations and the transmitter power efficiency.

By contrast, to the inventive embodiment of FIG. 1, no mixer is used and only the carrier signal passes through the PA and the antenna since the modulation is done after the antenna. Without a mixer, a very efficient non-linear PA can be used to achieve the high-order non-constant envelope modulations. A radio transmitter modulation method and apparatus according to the invention, increases transmitter efficiency by performing some or all of the radio carrier wave modulation after the antenna. Therefore, one of the characteristics of the new architecture is to remove the trade-off between high order non-constant envelope modulations and the transmitter power efficiency.

We define antenna "near field" as residing within a physical dimension on the order of the dimensions of the antenna elements. The "far field" then begins at dimensions beyond the near field. In a transmitter architecture according to the invention, such as that of a radio transmitter 100, actions in the near field of antenna 101 are caused by the operation of switches 103. We define "modulation after the antenna" or "near field modulation" or "near field antenna modulation" as the actions in the near field that cause the transmission of a modulated signal in the far field.

Figure 3:
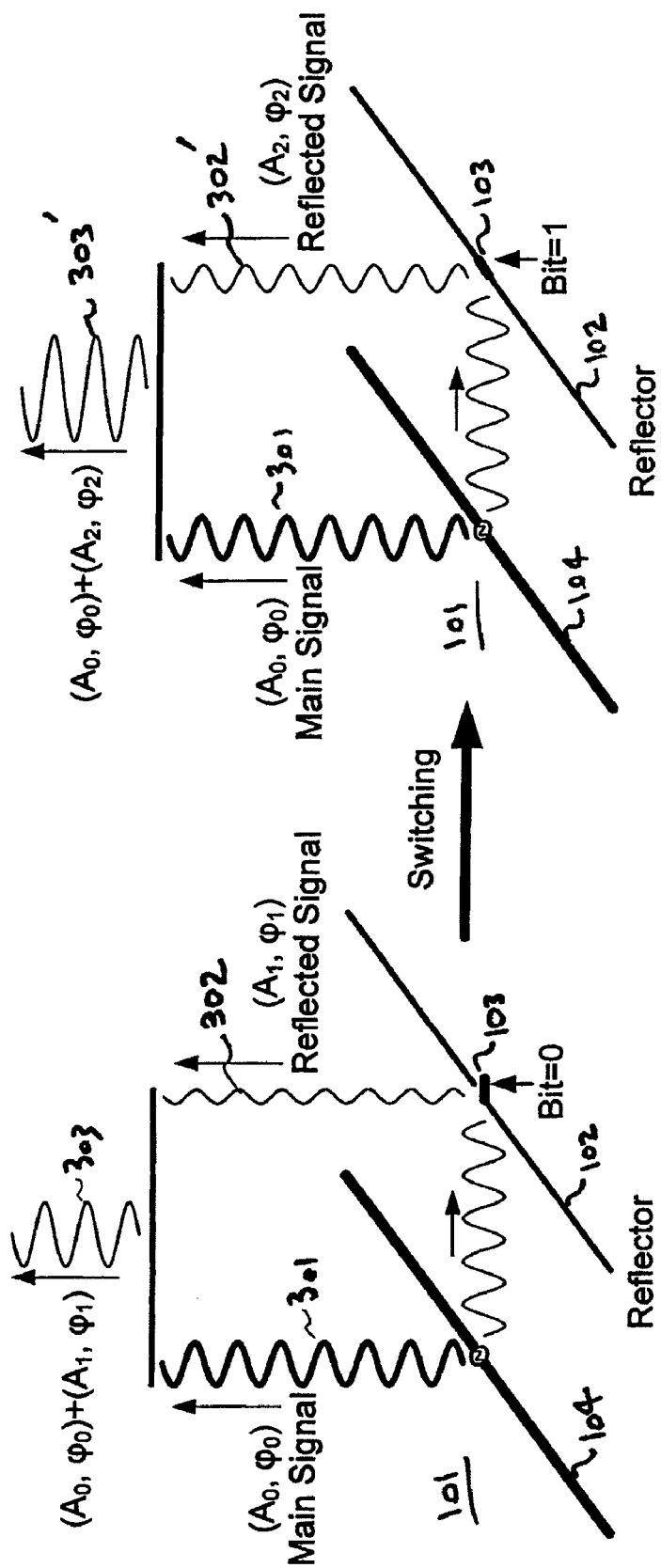
FIG. 3 illustrates the principle of operation of near field modulation using one reflector switch.

FIG. 3 illustrates the principle of operation of near field modulation using one reflector switch. FIG. 3 shows a signal diagram of actions in the near field for an antenna 101 having one driven element 104 and one reflector 102 having one switch 103. In this architecture as seen in FIG. 3, some parts of the main signal 301 which are transmitted from the main antenna get reflected from the adjacent reflectors. The reflected signal 302 interferes with the main signal 301, and changes the amplitude and phase of it. The amplitude and phase of the reflected signal 302 depend on the effective length of the reflector which can be changed by using switch 103 shown on reflector 102. Different reflector effective lengths correspond to different phase and amplitudes of the reflected signals. By turning switch 103 on ("bit=1") and off ("bit=0"), the phase and amplitude of the reflected signal 302 changes to 302'. Because of the interference of the reflected signal 302 with the main signal 301, both the phase and the amplitude of the main signal 301 also change. Thus, the main signal 301 is effectively modulated by turning switch 103 on or off resulting in a modulated signal 303 (a first modulation state), or a modulated signal 303' (a second modulation state), being transmitted into the far field.

Figure 4:
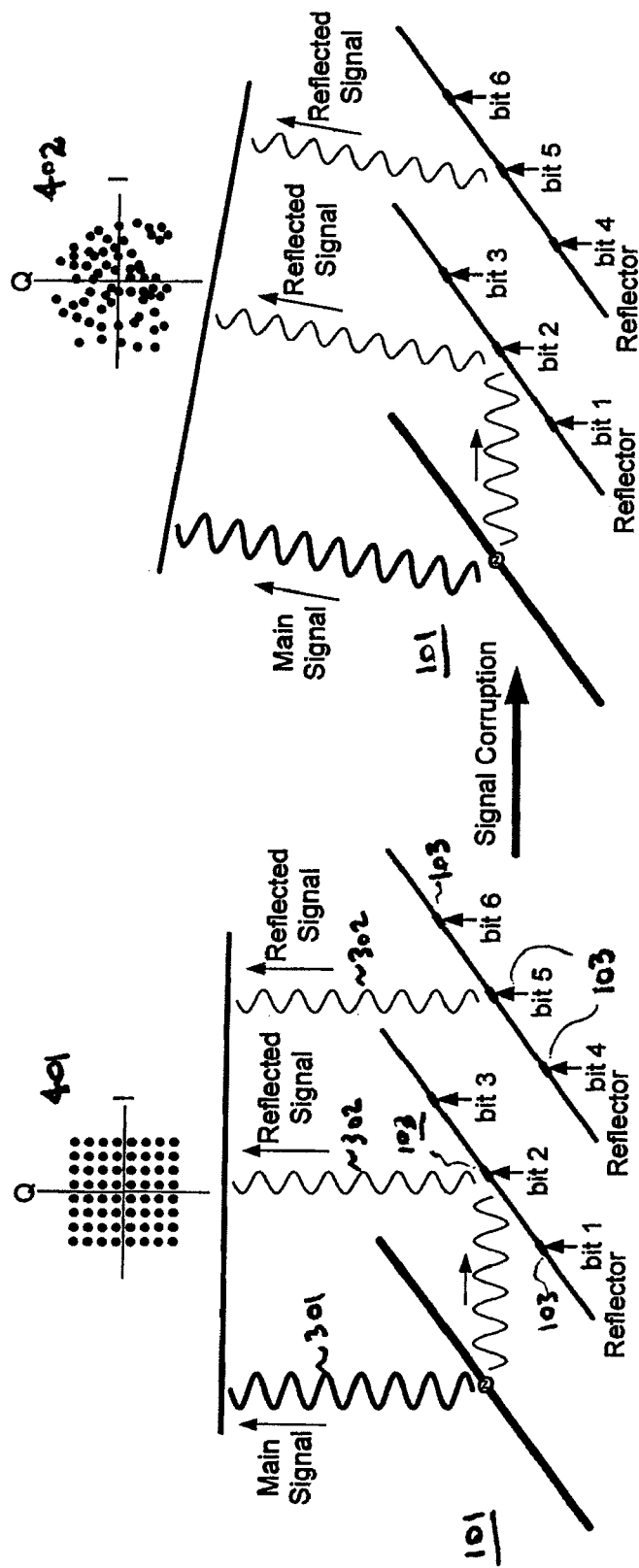
FIG. 4 illustrates the principle of operation of near field modulation using a plurality of reflector switches.

FIG. 4 shows another embodiment of an antenna 101 having one driven element 104 and two reflectors 102, each reflector 102 having three switches 103. A modulation constellation 401 shows what a receiver would observe by receiving and demodulating a far field signal 303 at a given angle from antenna 101. Modulation constellation 402 shows what a receiver would observe by receiving and demodulating the same far field signal 303, but at a different angle, 10 degrees clockwise from the angle representing received modulation constellation 401. A transmitter according to the inventive architecture causes the phase and amplitude of the reflected signal to change with the angle from the antenna. The change is not as same as the main signal phase and amplitude variation with the angle. Because the modulation points are shaped by combination of these two signals, at different angles from antenna 101, we end up with different modulation points as shown in FIG. 4.

The directionally dependent modulation (angle dependent modulation) characteristics of a transmitter according to the invention allows for implementation of a very secure communication channel. To more conveniently describe directionally dependent modulation, we define an "information beam." An information beam has an "information beam width" in 3D that describes a solid angle (3D), the solid angle within which the information is transmitted without error. In other words, a correctly modulated signal is transmitted only in one or more desired directions by one or more information beams. At a desired angle within the information beam width of antenna 101, a receiver can receive and demodulate the correct modulation points. Receivers at un-desired angles from antenna 101, i.e. outside of the information beam width, might receive sufficient RF power, but the received signals are completely corrupted. Signal received outside of the information beam width cannot be demodulated to recover the baseband signal. Note that in the "non-allowed" or undesired directions some of the constellation points can fall on top of each other and thus it is also impossible to distinguish them.

By contrast, note that in conventional transmitter architectures, all of the information passes through the antenna. Thus, the information is broadcast everywhere in the radiation pattern of a conventional radio transmitter antenna. Also, because of the side lobes of the conventional transmitter antenna radiation pattern, any receiver with enough sensitivity can receive the correct information signals (by successfully demodulating the original transmitted baseband signal) at a wide range of angles from the transmitting antenna. Therefore, such a directionally dependent secure communication system cannot be implemented using conventional transmitter architectures.

Figure 5:
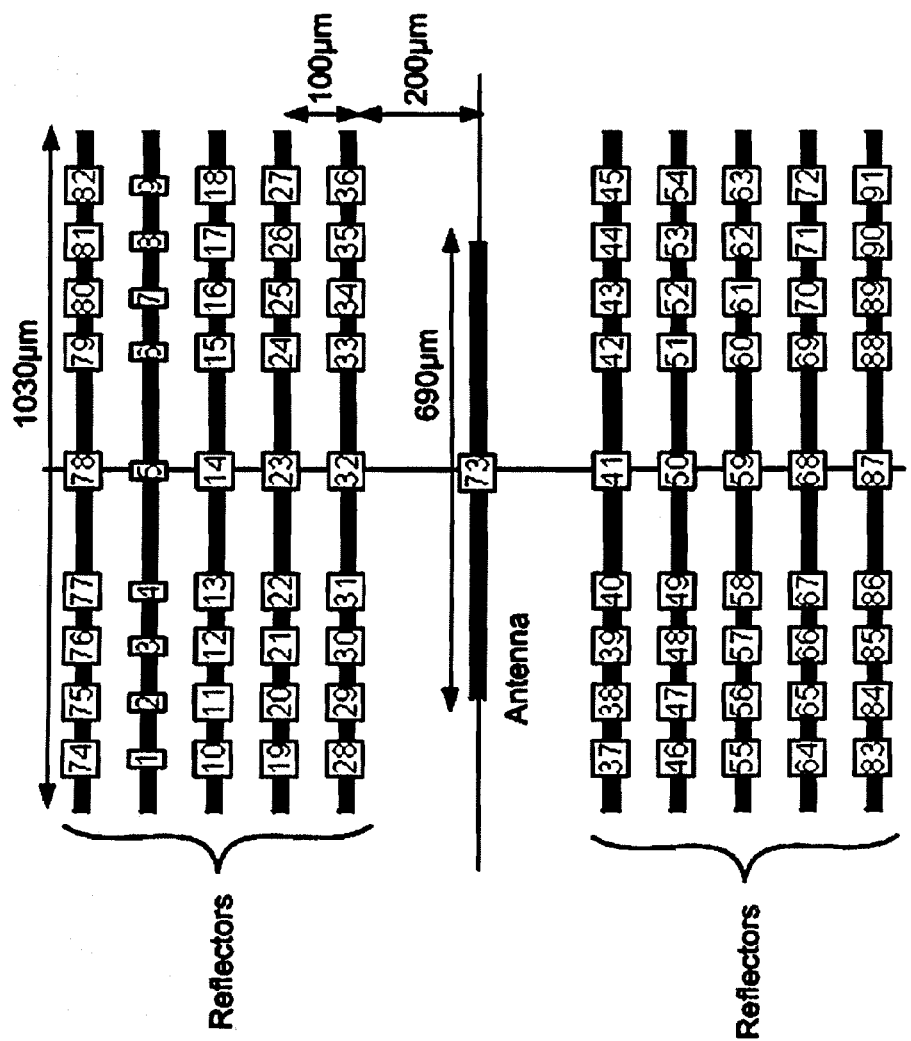
FIG. 5 shows an antenna configuration used in IE3D simulations.

FIG. 5 shows an antenna configuration used in actual simulations performed using IE3D (available from Zeland Software, Inc. of Fremont, Calif.), a moment based EM solver software. In the design of FIG. 5, a dipole antenna driven element 104 and eight reflectors 102 were placed on the boundary of semi-infinite regions of air and silicon. In this case, antenna 101 is modeled as fabricated on a silicon substrate and most of the power gets absorbed into a silicon substrate. In reality, this architecture can be implemented by using a finite size hemispherical silicon lens underneath the dipole antenna. Hemispherical silicon lenses suitable for this application are described in U.S. patent application Ser. No. 11/525,757, entitled "mm-Wave Fully Integrated Phased Array Receiver And Transmitter With On Chip Antennas" filed on Sep. 22, 2006 and incorporated herein by reference in its entirety. In the design embodiment of FIG. 5, ninety switches 103 can control the effective length of the reflectors. To find a desired switch combination for each constellation point, a MATLAB code (MATLAB is a high-level mathematical software language available from the MathWorks Corporation of Natick, Mass.) randomly turns the switches on or off to find the best switch combinations for each constellation point.

Figure 6:
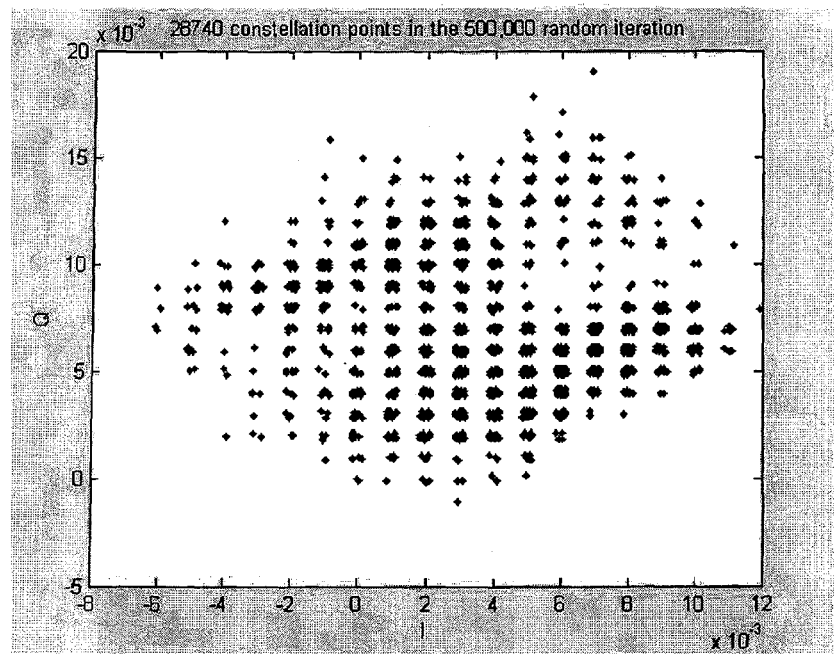
FIG. 6 shows an exemplary modulation constellation at the bore-sight angle ($\theta$=0) using the transmitter architecture of FIG. 5.

Bore-sight is defined herein as a direction substantially orthogonal to a plane created by at least one driven element 104 and at least one reflector 102. The bore-sight angle is defined herein as θ=zero degrees. FIG. 6 shows an exemplary modulation constellation at the bore-sight angle (θ=0°) that can be achieved using the transmitter architecture in FIG. 5. The modulation constellation of FIG. 6 illustrates the result of 500,000 random iterations of switch 103 positions. Among 500,000 iterations, 28740 points matched the two following criteria (I and II) at the bore-sight angle (θ=0°):

Criterion I

At each switch combination, the change in antenna impedance should be less than 10Ω. The reason that the antenna impedance changes with switching is the fact that some of the signals are reflected back to the antenna and change the effective impedance as seen at antenna port. Ideally, one would like to minimize the impedance changes because impedance change at antenna port affects the phase and amplitude of the main signal. However, since these changes are systematic, they can be considered in the MATLAB code and compensated with the right switching scheme.

Criterion II

For an ideal set of constellation points with a distance of d between two adjacent points, an acceptable switch combination should result in a constellation point which is within a radius of 0.15 d from the closest point in that ideal set.

Note that some or all of points in the modulation constellation can be created by more than one combination of positions for switches 103. This aspect of the invention can provide redundancy at a particular constellation point. Also, the constellation point switch 103 combination redundancy can be useful to keep modulation points in a desired direction (within an information beam) unchanged while at the same time changing the pattern of the corrupted points for directions outside of the information beam width.

Figure 7:
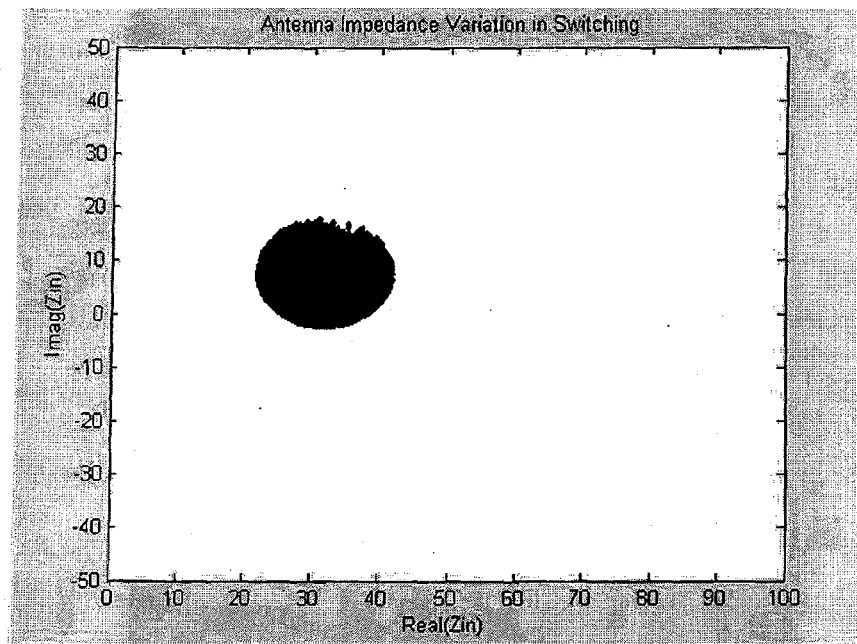
FIG. 7 shows the antenna impedance values corresponding to the constellation points of FIG. 6.
Figure 8:
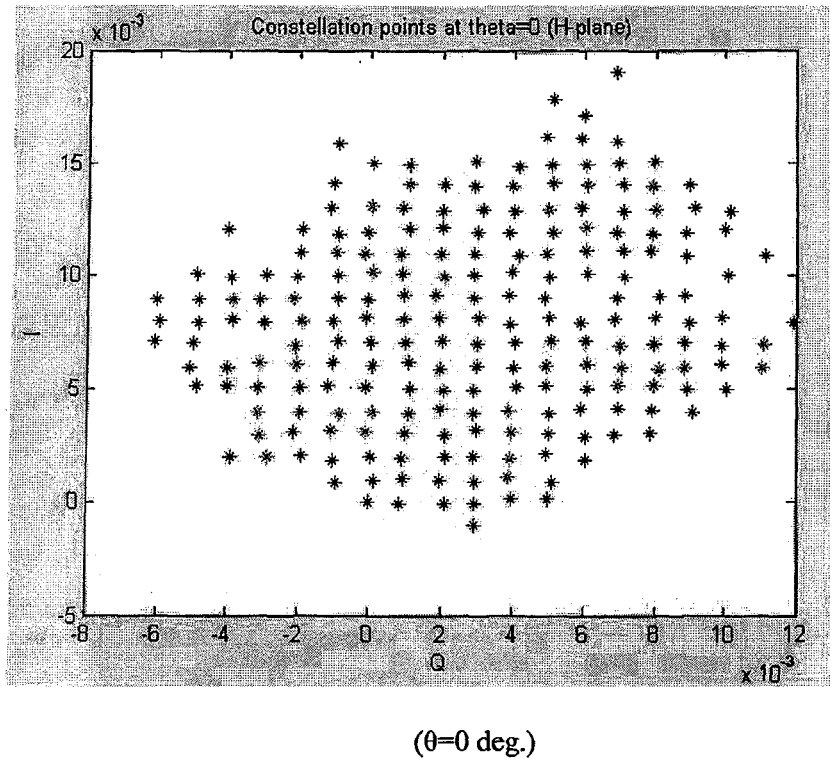
FIG. 8 shows modulation constellation points at the bore-sight angle.
Figure 9:
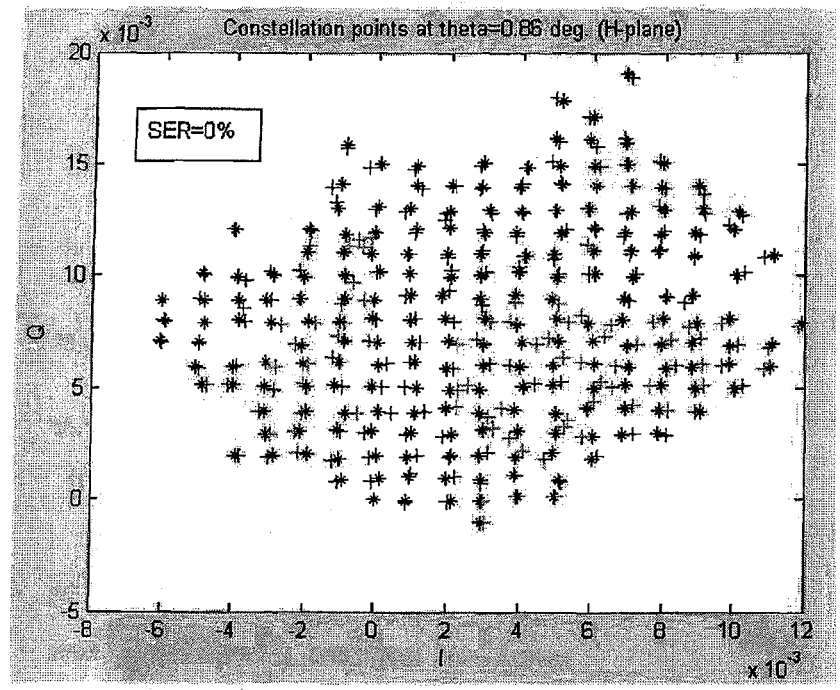
FIG. 9 shows how modulation constellation points become corrupted with a receiver at an angle 0.86° of from the bore-sight.
Figure 10:
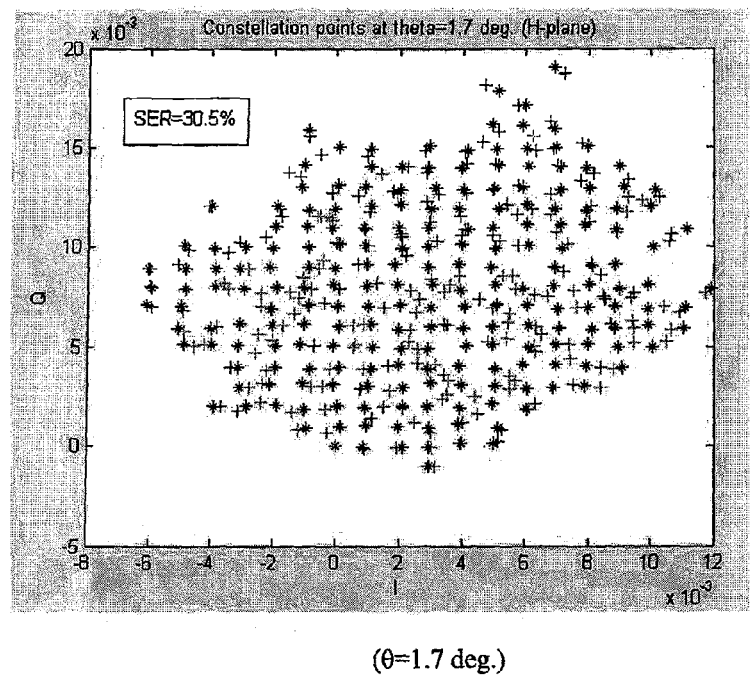
FIG. 10 shows how modulation points become corrupted with a receiver at an angle of 1.7° from the bore-sight.
Figure 11:
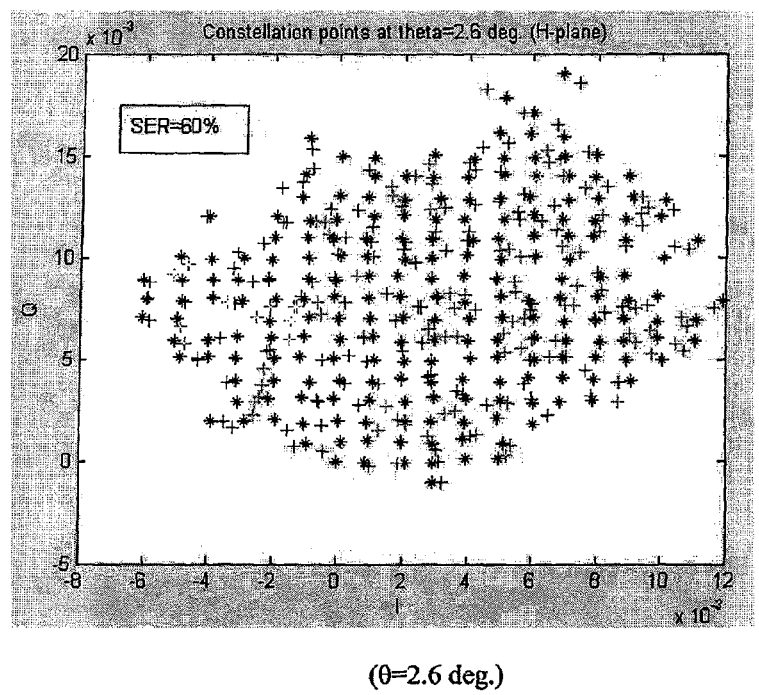
FIG. 11 shows how modulation points become corrupted with a receiver at an angle of 2.6° from the bore-sight.
Figure 12:
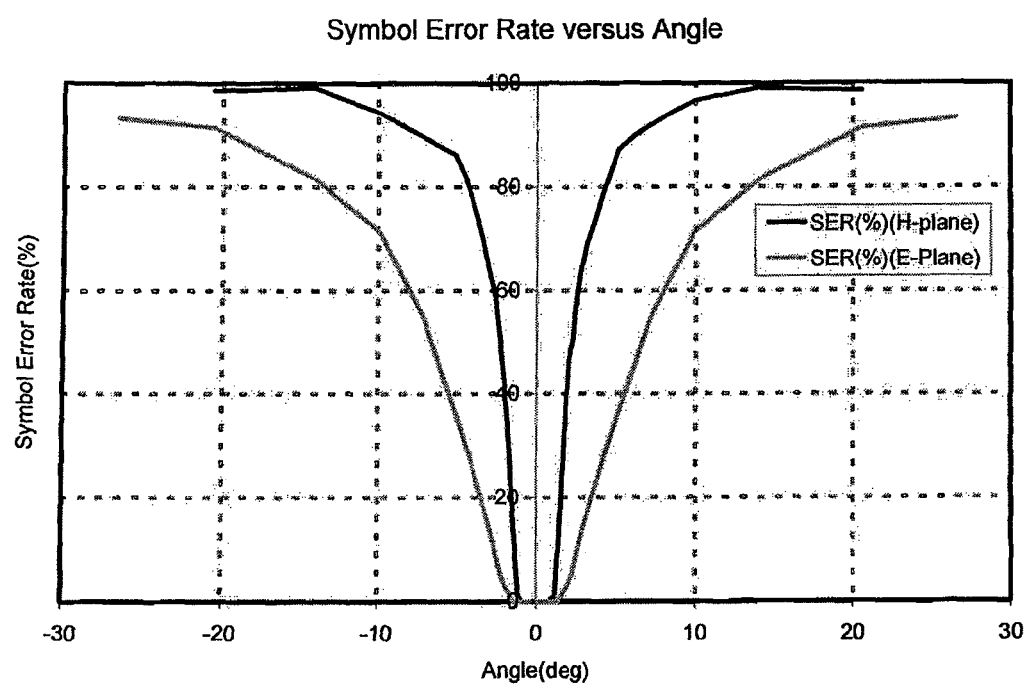
FIG. 12 shows a plot of the symbol error rate ("SER") versus angle for the H and E-planes.

FIG. 7 shows the antenna impedance values corresponding to the constellation points of FIG. 6. The 28740 points shown in FIG. 5 generate 210 distinguished points in the bore-sight angle (θ=0°). FIG. 8 (θ=0°, SER=0%), FIG. 9 (θ=0.86°, SER=0%), FIG. 10 (θ=1.7°, SER=30.5%), and FIG. 11 (θ=2.6°, SER=60%), show how modulation points become corrupted when the receiving point moves from the bore-sight angle of zero degrees on the H-plane of the antenna. SER is defined as the symbol error rate. The stars (represented by the * character) are the correct points. FIG. 12 shows a plot of SER versus angle for the H and E-planes. In FIG. 12, the E-plane is the plane parallel to dipole and the H-Plane is the plane perpendicular to the dipole.

EXAMPLE 1

Figure 13:
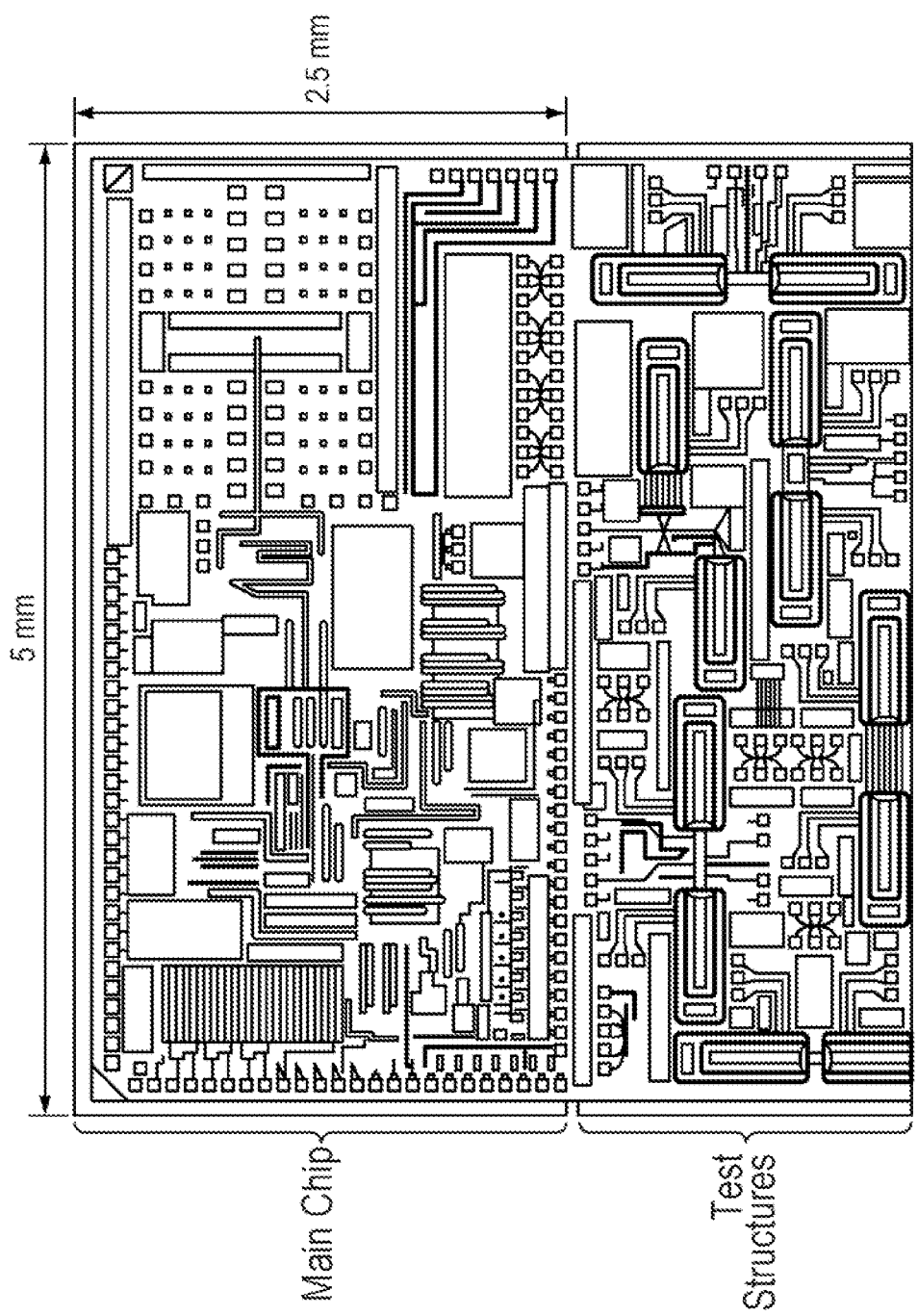
FIG. 13 shows a chip monograph of an exemplary monolithic integrated circuit according to the inventive radio transmitter architecture.
Figure 14:
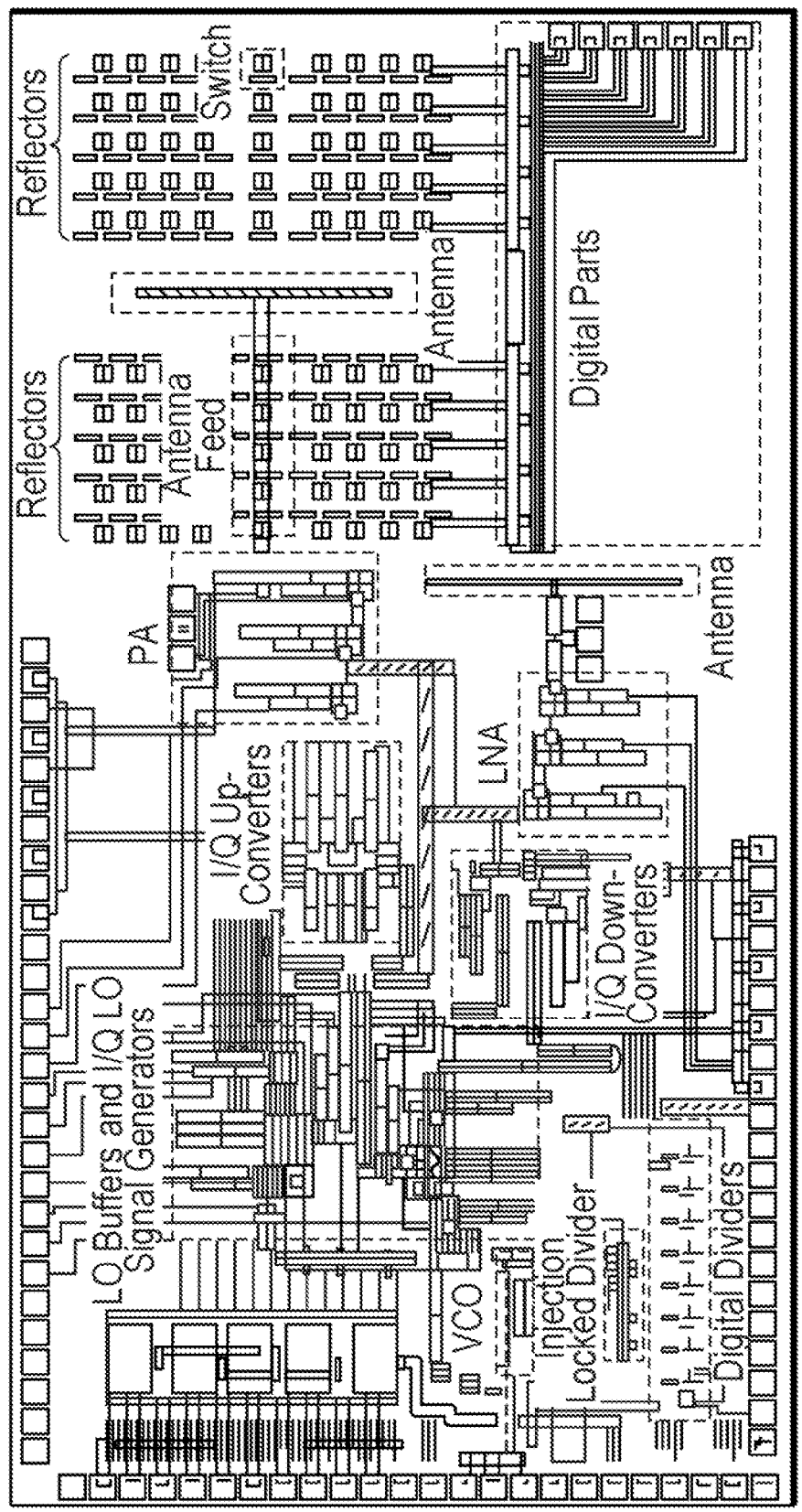
FIG. 14 shows a view of a circuit layer of the chip of FIG. 13.
Figure 15:
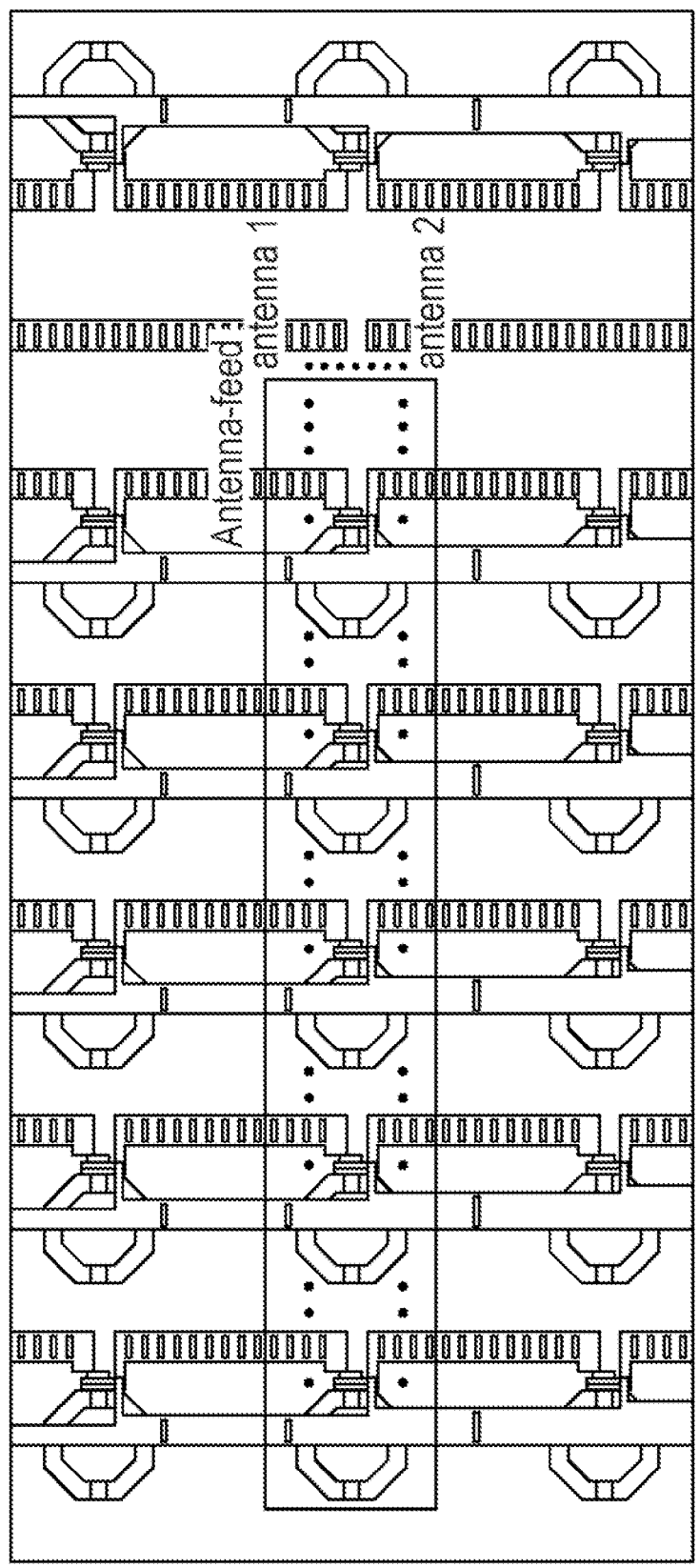
FIG. 15 shows a close up view of antenna elements of the chip of FIG. 13.
Figure 15A:
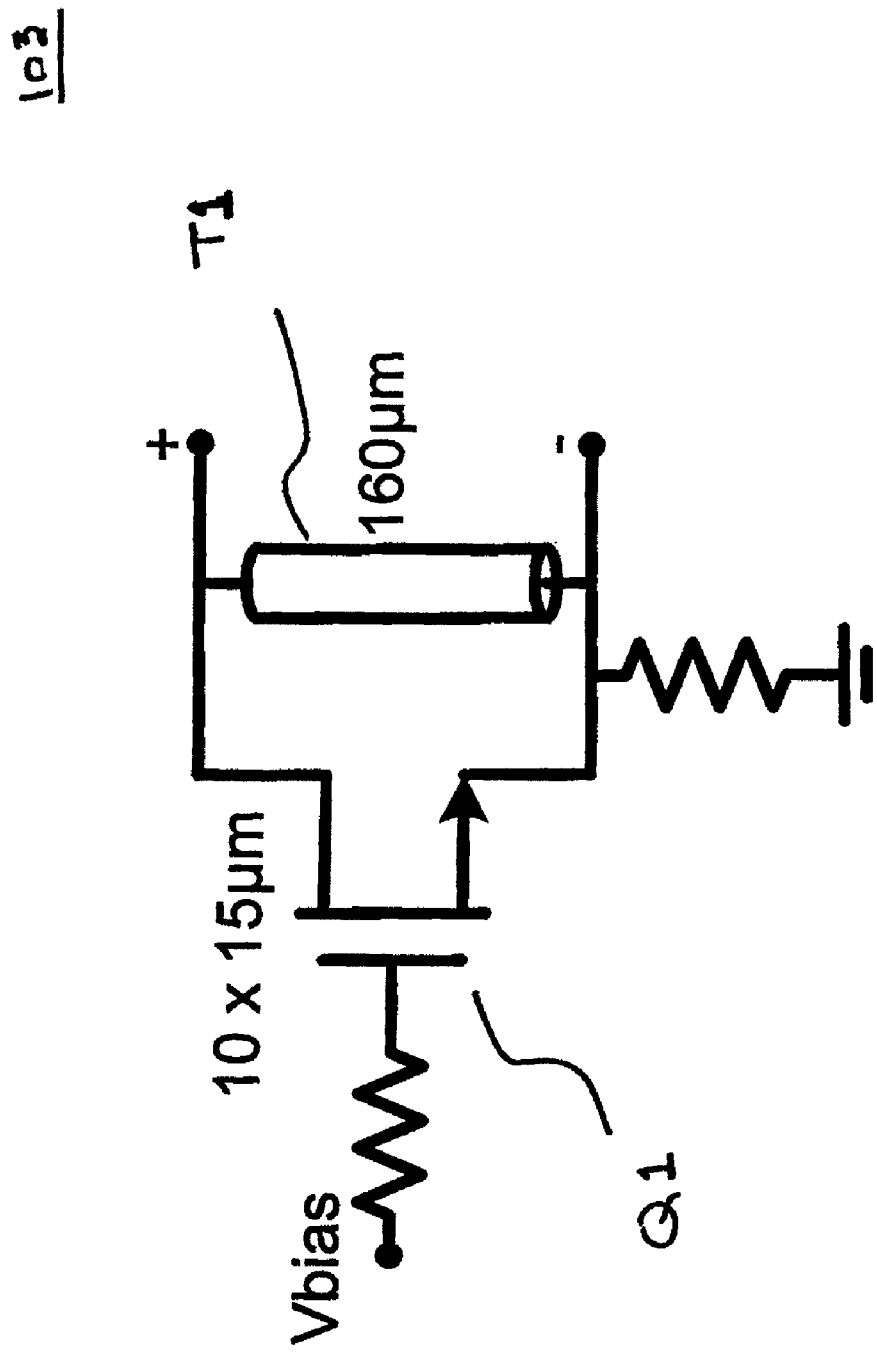
FIG. 15A shows a schematic drawing of one embodiment of a reflector switch.

An exemplary monolithic chip using the inventive radio transmitter architecture is shown in the chip micrograph of FIG. 13. The chip, a 60 GHz transceiver, was fabricated using the IBM 130 nm SiGe process. FIG. 14 shows a view of a circuit layer noting the locations of various transmitter elements, including a dipole antenna (the driven element) and associated reflectors and reflector switches. The dimensions of the exemplary chip are about 5 mm by 2.5 mm. FIG. 15 shows a close up view of the antenna elements including the transmission line feeding the antenna driven elements and meander transmission lines serving as reflector inductors. The shielded differential transmission line, which is implemented on the top metal layers, minimizes RF signal coupling to the reflectors which are implemented on the bottom metal layers. Also, to minimize feed effects on the antenna pattern, the feed lines are designed to be perpendicular to the antenna. The inductors are used to resonate out the capacitance of the switches at the off state. FIG. 15A shows a schematic drawing of one embodiment of a switch 103 design. In the switch 103 embodiment of FIG. 15A, the inductance of the transmission line T1 serves as a reflector inductor used to resonate with the parasitic capacitance of transistor Q1 when switch 103 is off. It is also contemplated that switches 103 can be Micro Electro Mechanical Systems (MEMS) switches.

EXAMPLE 2

Figure 16:
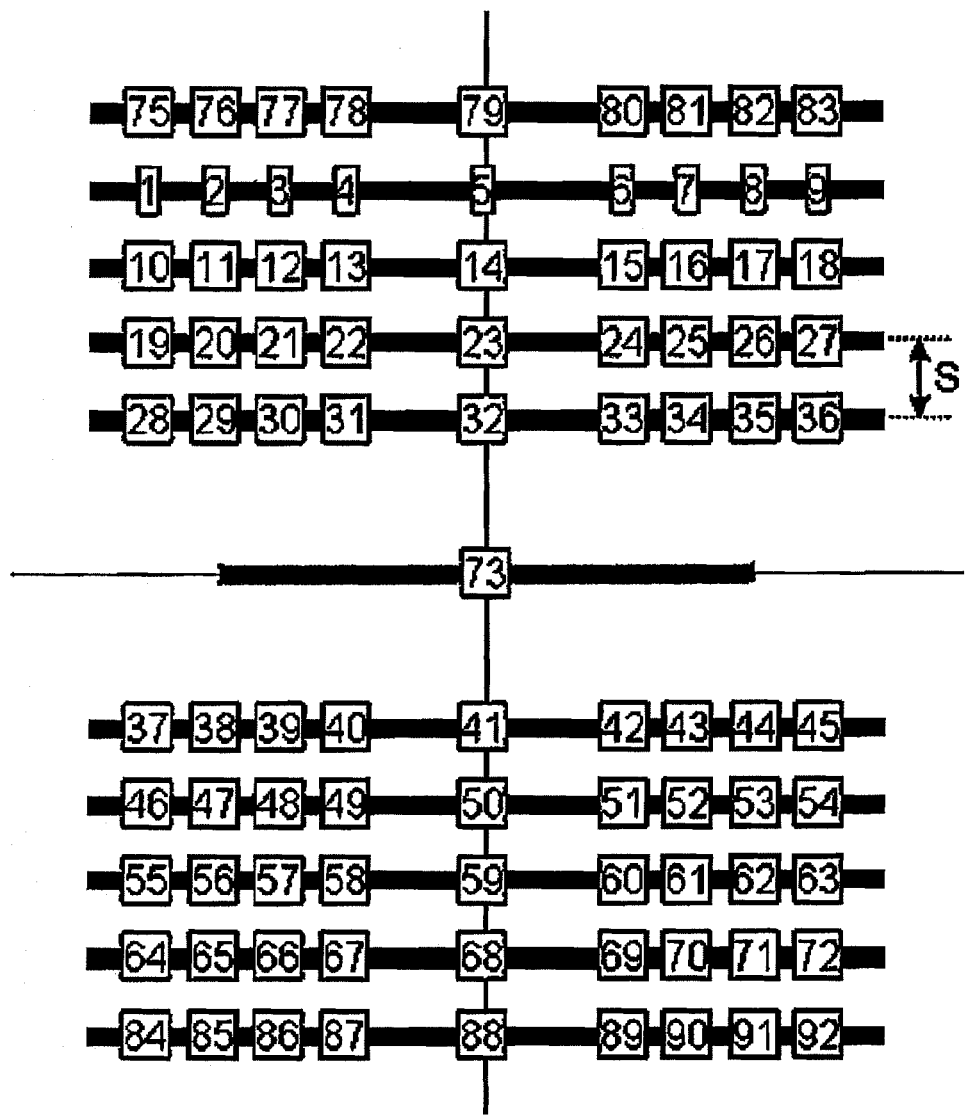
FIG. 16 shows an antenna configuration used for S parameter extraction.
Figure 17:
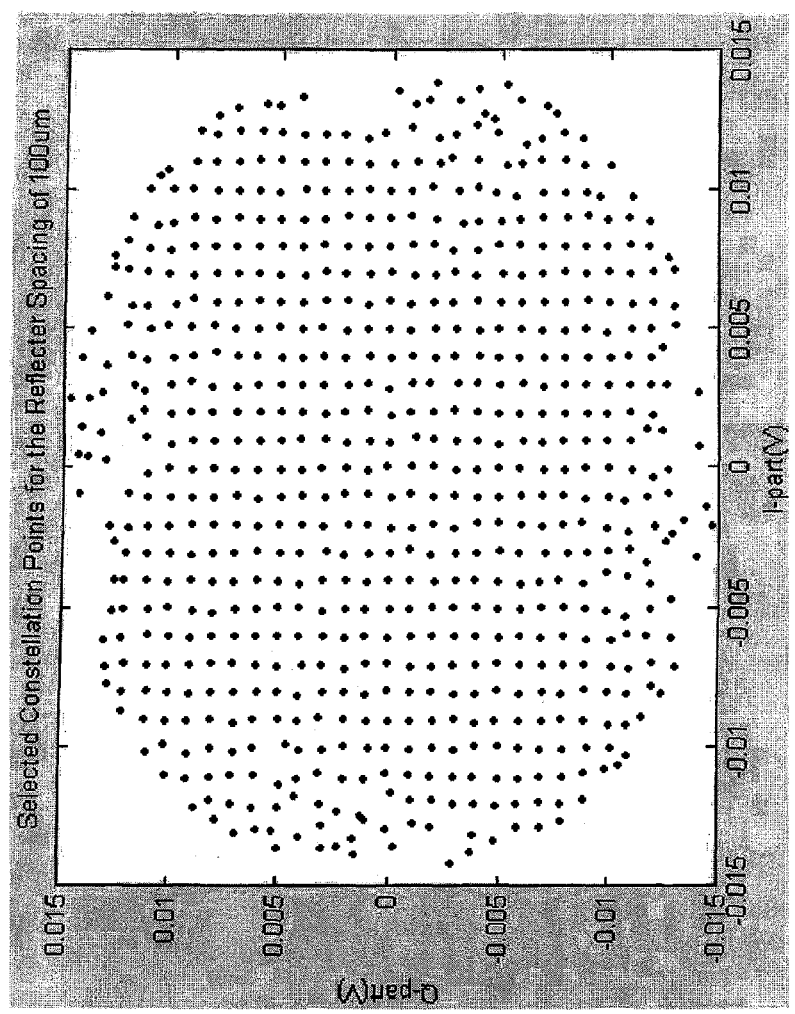
FIG. 17 shows a modulation constellation created using the antenna configuration of FIG. 16 with quadrant selection performed before the antenna.
Figure 18:
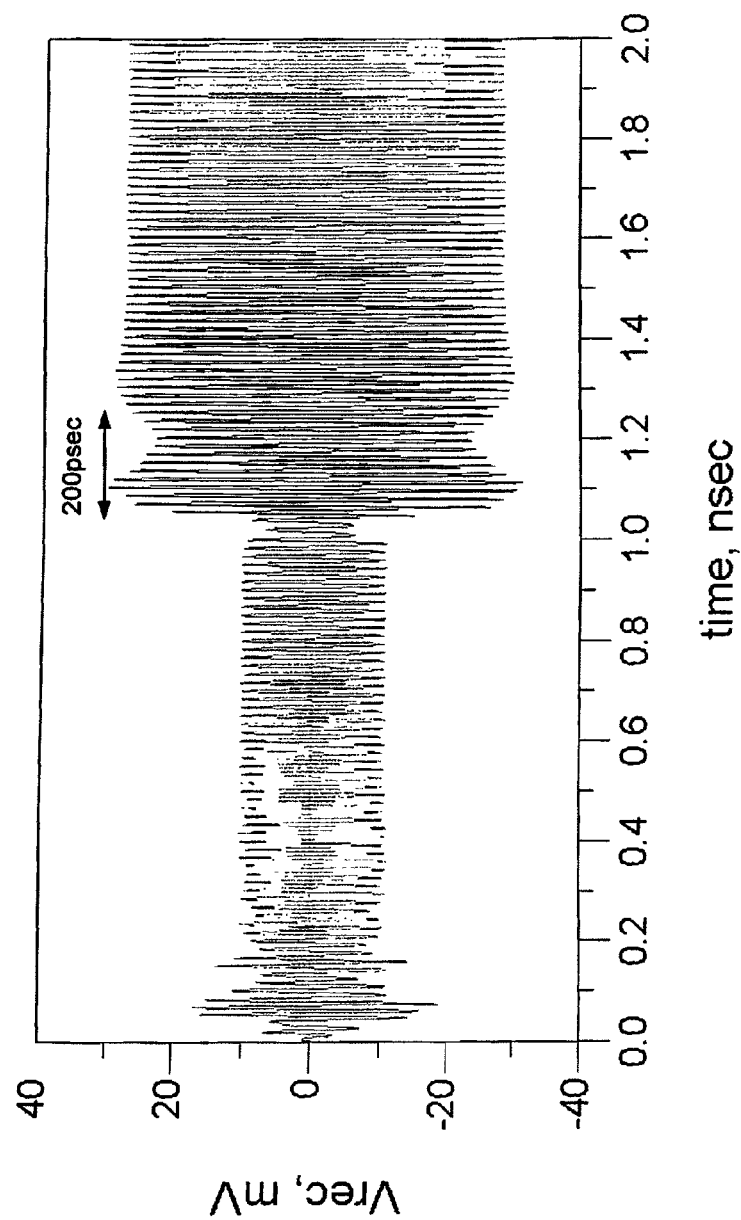
FIG. 18 shows a plot of the transient response of the reflectors of the antenna configuration of FIG. 16.

Further simulations have been performed to illustrate the inventive radio transmitter architecture. The methods used for simulation are described in more detail in the theoretical modeling section below. As shown in FIG. 16, to model the expected performance of a 130 nm SiGe PA driving an antenna, we performed an S-Parameter extraction using the EM simulation program IE3D. Local differential ports were used to fully characterize the antenna reflector structure and the far field was probed by a simple dipole antenna. The S-Parameters were generated by single EM simulation. A MATLAB code was used to calculate the far field for the various switching combinations tested. The antenna impedance with switch combinations was considered. In one simulation of equally spaced constellation points, as shown in FIG. 17, a reflector spacing of 100 μm was used and 684 almost equally spaced points were plotted. In this example, as described in more detail below, quadrant selection was performed before the antenna. The transient response of the reflectors is shown in FIG. 18. For a carrier frequency of 60 GHz, the far field time response to a new switch combination was found to be less than 200 picoseconds using an ideal switch model. This shows that the transient response is effectively limited by the switch itself.

Figure 19:
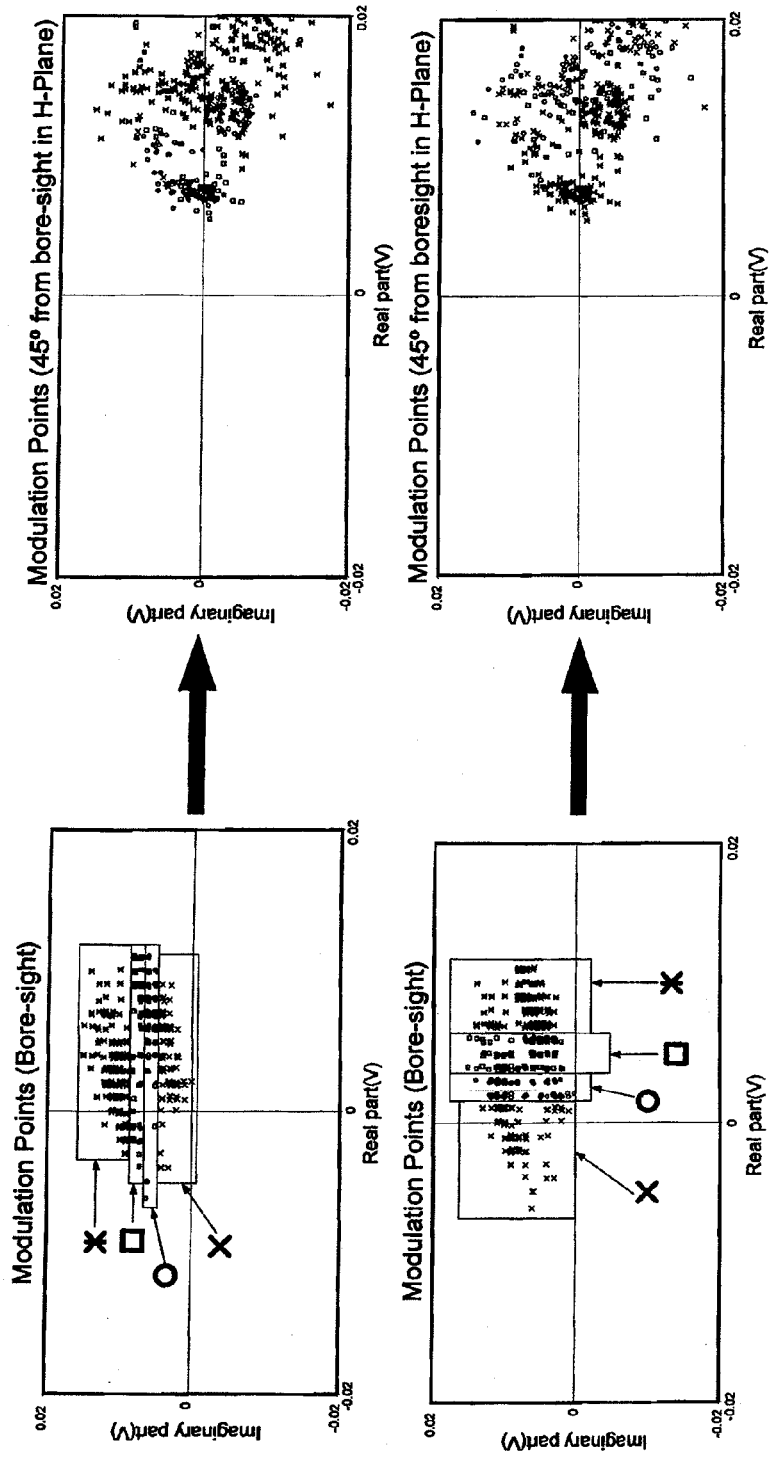
FIG. 19 shows modulation points at a bore-sight angle and corrupted modulation points at 45 degrees from the bore-sight in the H plane.

FIG. 19 shows a simulation of the directional nature of the communication link security feature of the inventive transmitter architecture. The pair of plots on the top of FIG. 19 show modulation points for a bore-sight angle (upper left side) and the corresponding corrupted modulation points at 45 degrees from the bore-sight in the H plane (upper right side). The bore-sight points (upper left side) are considered in horizontal slices as shown by rectangles. FIG. 19 is coded in four symbols to show how the points in the horizontal slices fall on the modulation constellation at 45 degrees (upper right side plot). The pair of plots on the bottom of FIG. 19 show the same modulation points for a bore-sight angle (lower left side) and the corresponding corrupted modulation points at 45 degrees from the bore-sight in the H plane (lower right side plot). This time, the bore-sight points (lower left side) are considered in vertical slices as shown by rectangles and coded in four symbols to show how the points in those vertical slices fall on the modulation constellation at 45 degrees (lower right side plot). As expected, the 45 degree points are completely corrupted. Signals outside of the information beam width (such as at 45 degrees in FIG. 19) cannot be recovered, even by an ideal noiseless receiver.

Figure 20:
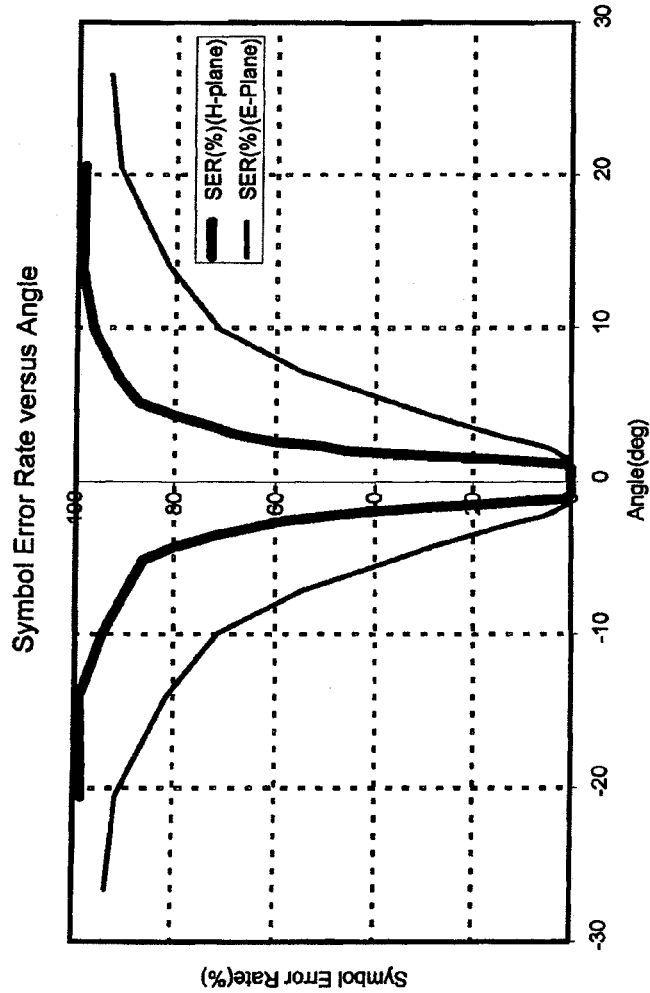
FIG. 20 shows a graph of symbol error rate versus angle.
Figure 20:
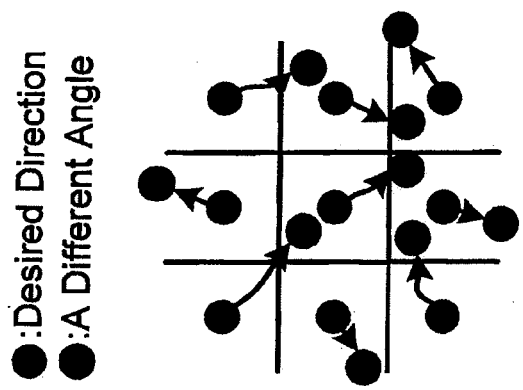

FIG. 20 shows a graph of symbol error rate ("SER") versus angle. Two curves are plotted, one for SER in the H-plane and one for the SER in the E-plane. The curves are based on 210 equally spaced points. The bore-sight was aligned with the desired information direction. Note that the SER reaches 0% within the information beam. As previously described, the width and direction of an information beam width can be steered by use of different sets of switch combinations.

Figure 21A:
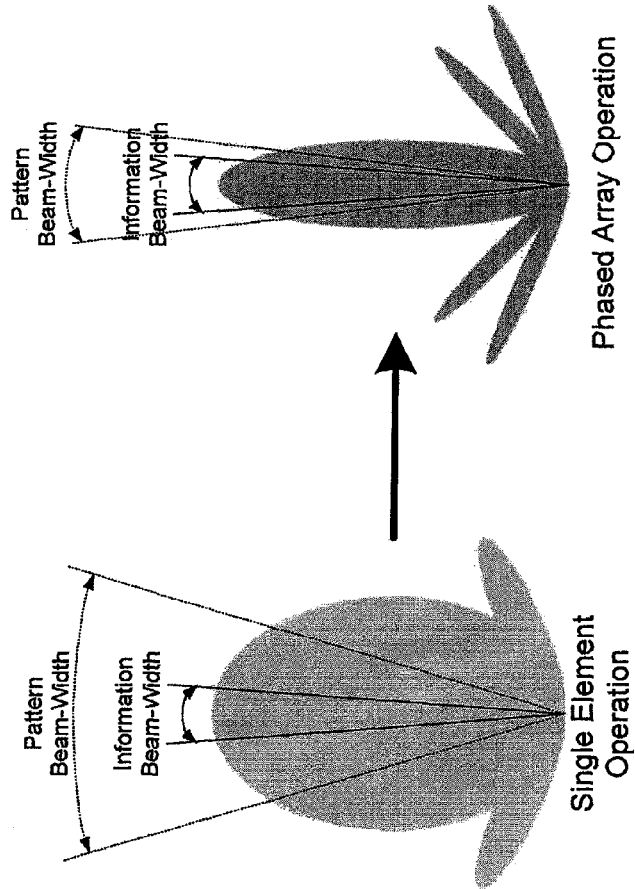
FIG. 21A shows an exemplary antenna radiation pattern of the inventive transmitter.
Figure 21B:
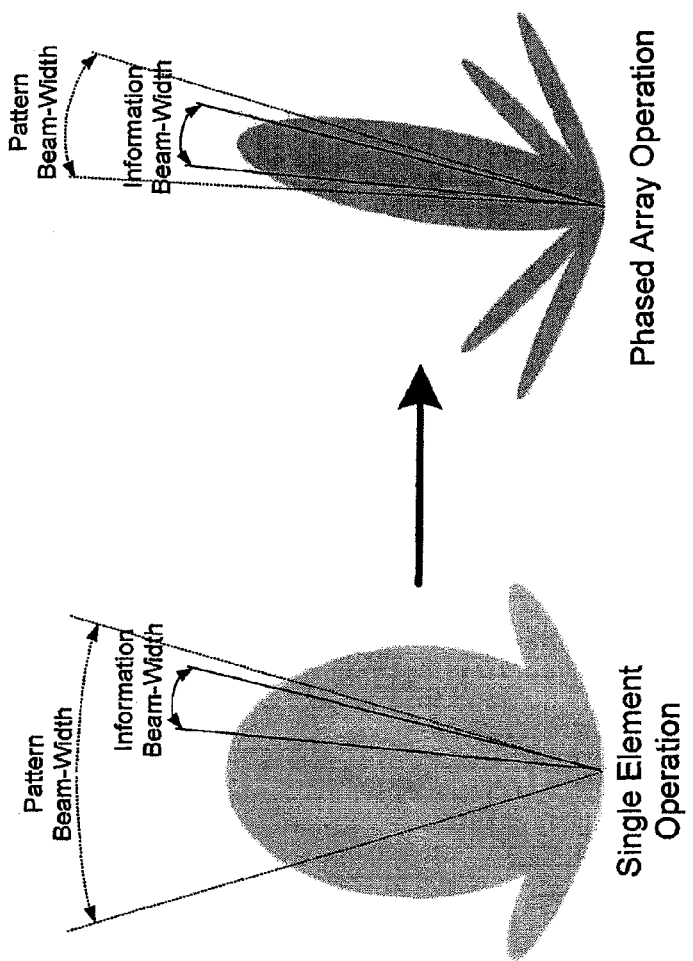
FIG. 21B illustrates the use of phase array antenna techniques with the inventive transmitter architecture.

In yet another embodiment of the invention, the inventive transmitter architecture can be combined with phased array antenna technology. Here, we shape and control the direction of not only the information beam width, but also the pattern beam width. We define the "pattern beam width" as describing a solid angle in 3D within which a substantial portion of the radio frequency energy is directed. Generally the pattern beam width includes a "main lobe" of an antenna emission or radiation pattern, but not the "side lobes." FIG. 21A shows an exemplary antenna radiation pattern using the inventive transmitter architecture as heretofore described. The pattern beam width within the main lobe contains a significant portion of the total radio energy transmitted. Yet, even though a receiver located anywhere within the main lobe might receive enough radio signal energy to demodulate the signal, only a radio receiver within the information beam width can successfully demodulate the received signal to recover the baseband information. There can also be phased array operation, such as where two or more antennas 101 are employed, as shown on the right side of FIG. 21A. Using phased array techniques, the power efficiency of the system can be improved by making the antenna radiation pattern directional by steering the radiation pattern. On the right side of FIG. 21A a substantial portion of the available RF power is directed only in the direction of the information beam width. Note that even though power can also still be radiated in the side lobes, only a receiver within the information beam width can successfully demodulate the signal. FIG. 21B further illustrates the use of phase array antenna techniques with the inventive transmitter architecture. The left side of FIG. 21B shows a single antenna 101 creating an information beam width as previously described. As in the left side of FIG. 21A, the information beam width is a subset of the pattern beam width over which substantial RF power is radiated. In FIG. 21B, however, the information beam width has been shifted to the right while the pattern beam width remains as in FIG. 21A. Since any RF radiation outside of the information beam width cannot be successfully demodulated, that RF energy is wasted. On the right side of FIG. 21B, with the use of phased array antenna technology, such as by use of two or more antennas 101, RF power, at least with respect to the main lobe, is substantially confined to a solid angle only slightly larger than the information beam width, leading to improved power efficiency.

In another embodiment of the invention, it is contemplated that by making appropriate selections of switch 103 combinations and/or by use of multiple antennas 101, multiple information beam widths can be created. We define "multiple information beams" as a radio antenna radiation pattern (transmitted signals) having "multiple information beam widths" including two or more distinct, or overlapping, information beam widths such that a suitable receiver situated within any of the plurality of information beam widths can successfully demodulate the transmitted signals. Such multiple information beam widths can occur over a subset of solid angles within a radiated power pattern beam width. Alternatively, with the addition of phased array technology, as previously discussed, radiation patterns can be shaped to place a large percentage of the radiated RF power within the multiple information beam widths.

Figure 22A:
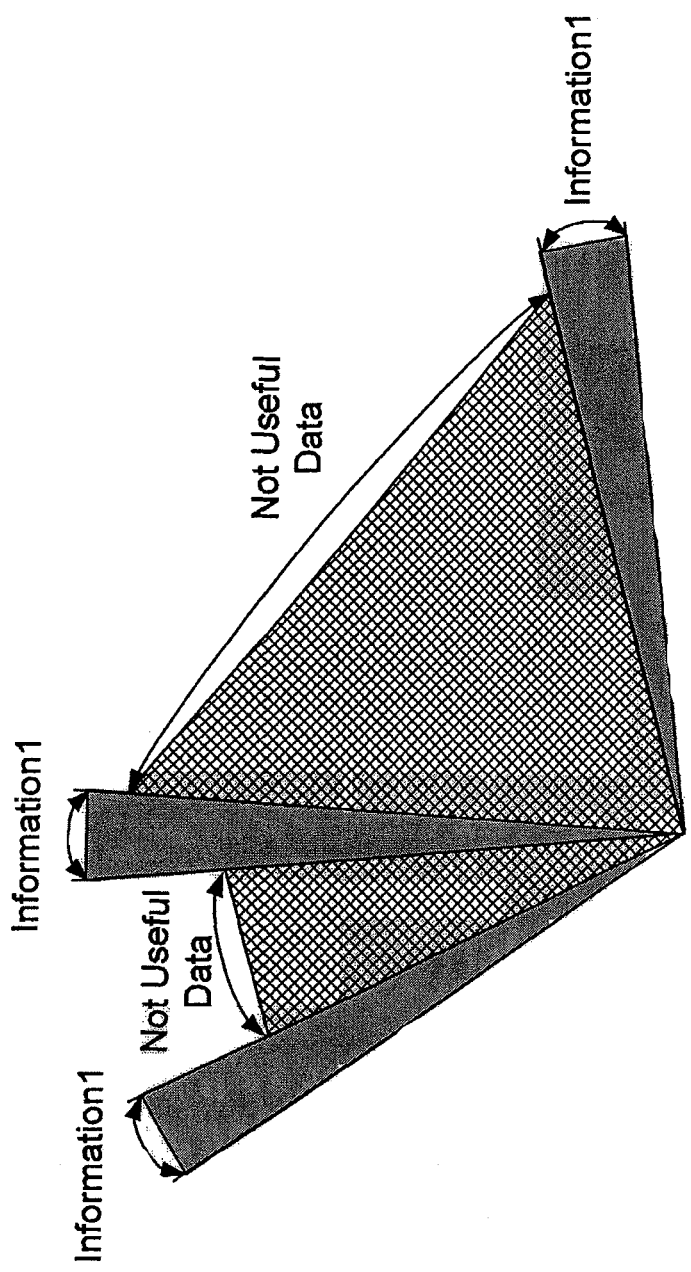
FIG. 22A shows an antenna radiation pattern illustrating the transmission of redundancy-multiple identical information.
Figure 22B:
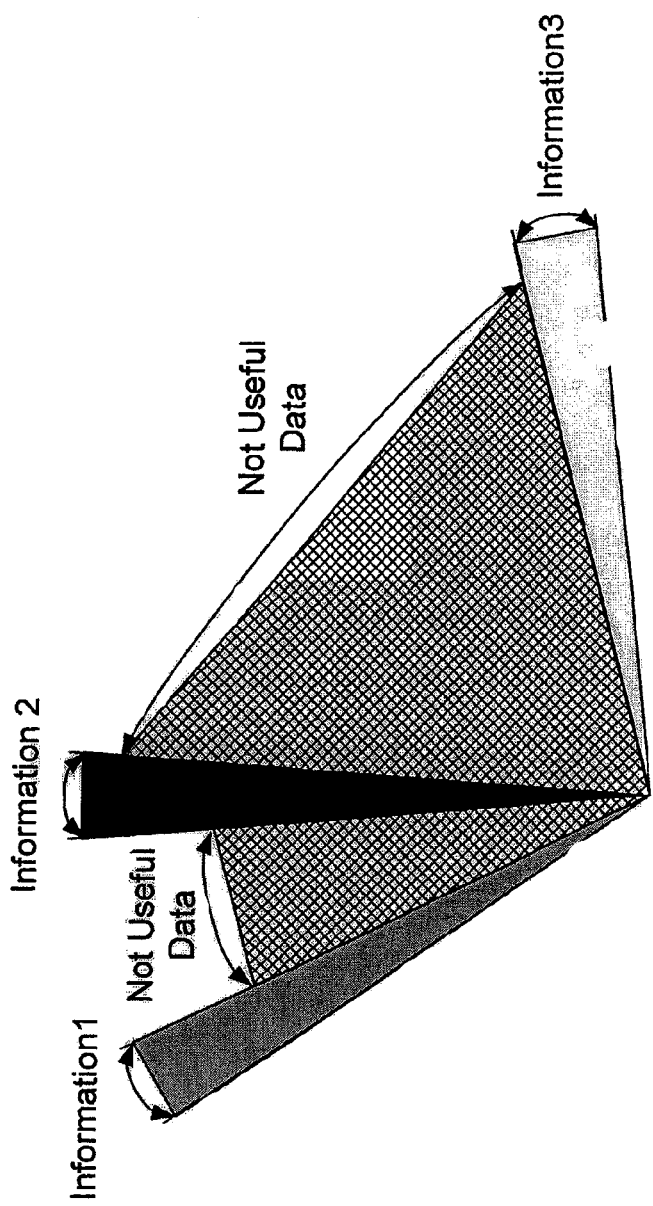
FIG. 22B shows an antenna radiation pattern illustrating the transmission of redundancy-multiple independent information.

There can be at least two multiple information beam operating modes. FIG. 22A shows an antenna radiation pattern having three distinct information beams, each information beam having a corresponding information beam width. In the exemplary embodiment of FIG. 22A, all of the information beams transmit the same information labeled as "information 1". Thus a transmitter operating according to the example of FIG. 22A can achieve a type of redundancy we call "redundancy-multiple identical information". Here, redundancy can be used to transmit identical information (e.g. information 1) in more than one desired direction. FIG. 22B shows an antenna radiation pattern having three distinct information beams, each information beam having a corresponding information beam width. In the exemplary embodiment of FIG. 22A, all of the information beams transmit different information labeled as "information 1," "information 2," and "information 3." Thus a transmitter operating according to the example of FIG. 22B can achieve a type of redundancy we call "redundancy-multiple independent information". Here, redundancy can be used to transmit different information (e.g. information 1, 2 and 3) to more than one desired direction. There can also be hybrid embodiments and/or modes in transmitters according to the exemplary embodiments and not shown in FIG. 22A and FIG. 22B, where there are copies of the same information in two or more information beams in addition to at least one other information beam transmitting independent information in another direction.

Figure 23:
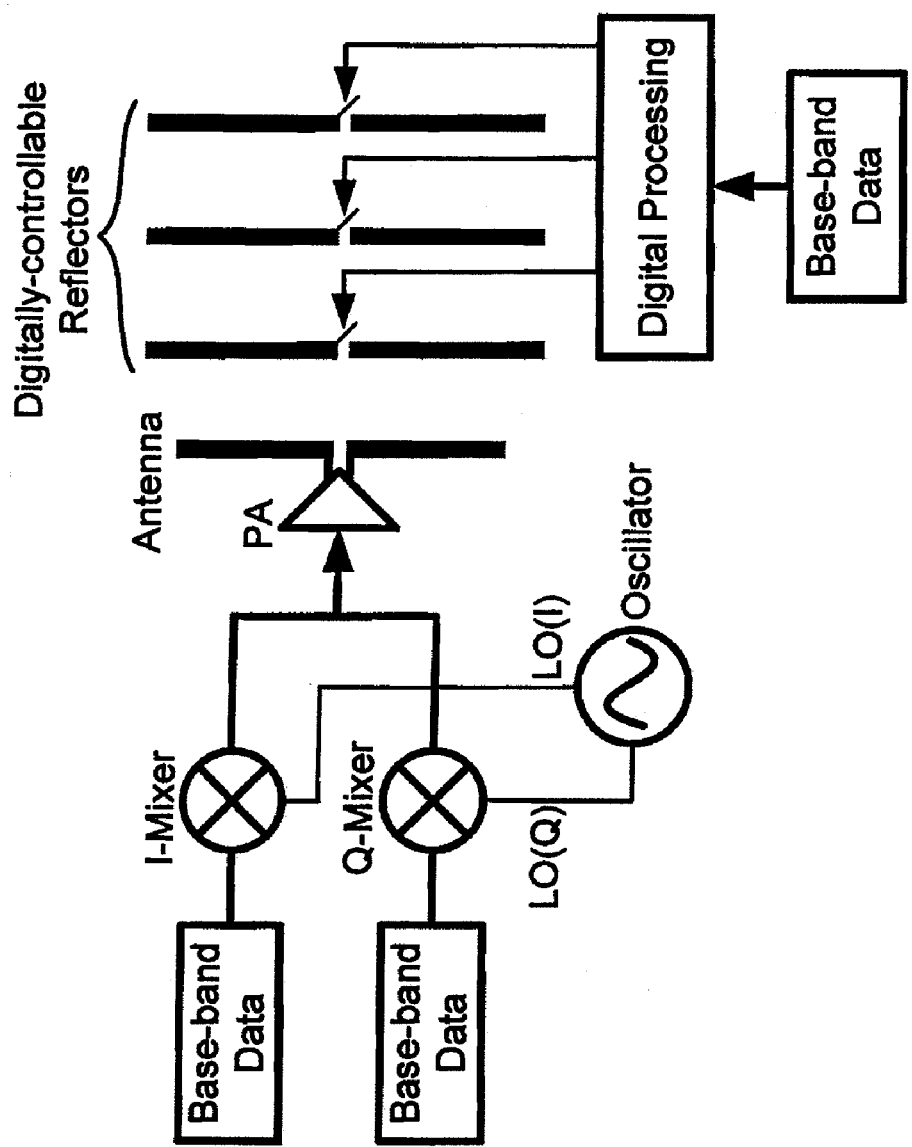
FIG. 23 shows an embodiment of the invention where some modulation is performed before the antenna.

Quadrant Selection Performed Before the Antenna:

FIG. 23 shows an embodiment of the invention where some modulation is performed before the antenna. In the embodiment shown in FIG. 23, quadrant selection can be done by a conventional mixer based scheme and antenna parasitic switching according to principles of the invention can be used to generate higher order modulations. Quadrant selection can be viewed as a "course tuning" modulation and the modulation after the antenna as a "fine tuning" modulation.

Figure 24A:
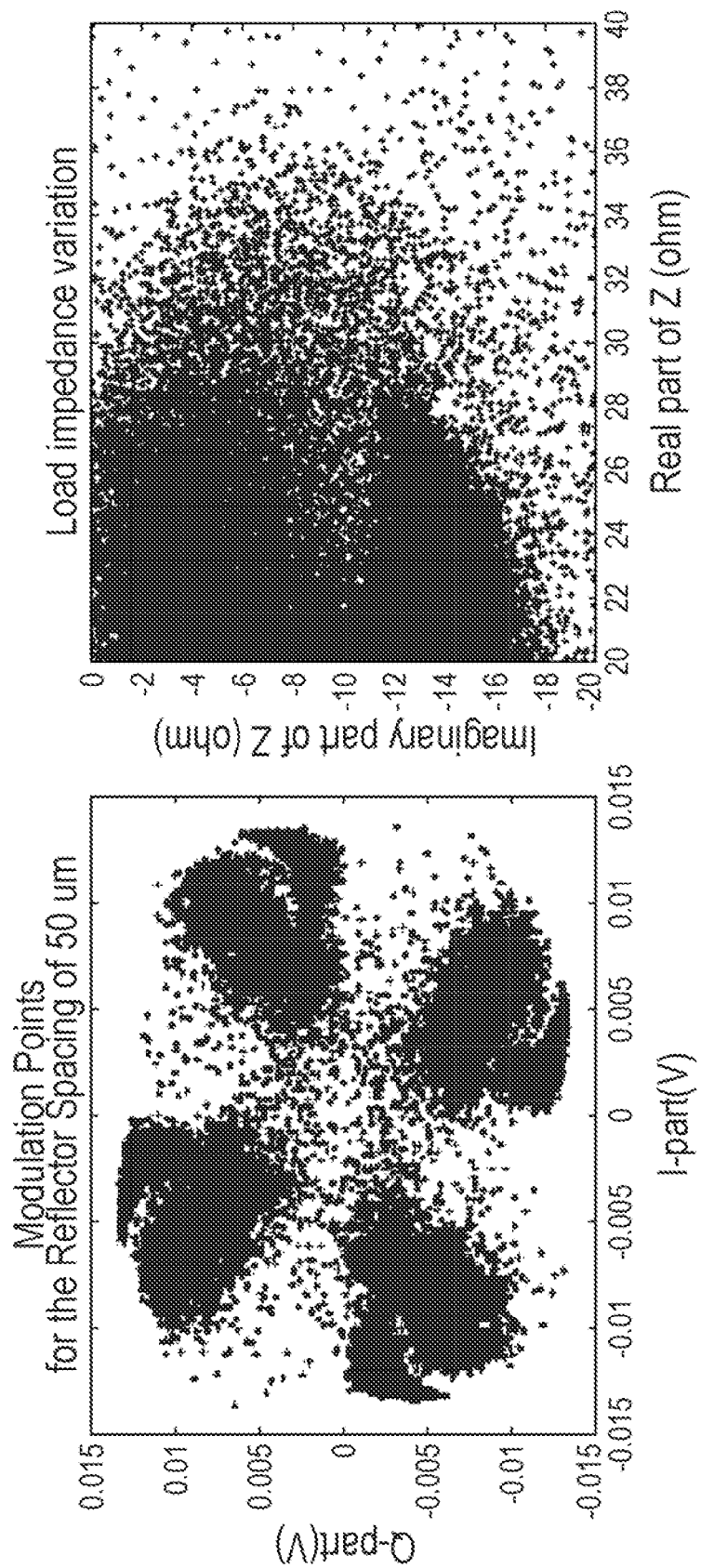
FIG. 24A shows a signal constellation simulation where five reflectors having 50 μm spacing are used on either side of the driven elements (a dipole) with quadrant selection performed before the antenna.
Figure 24B:
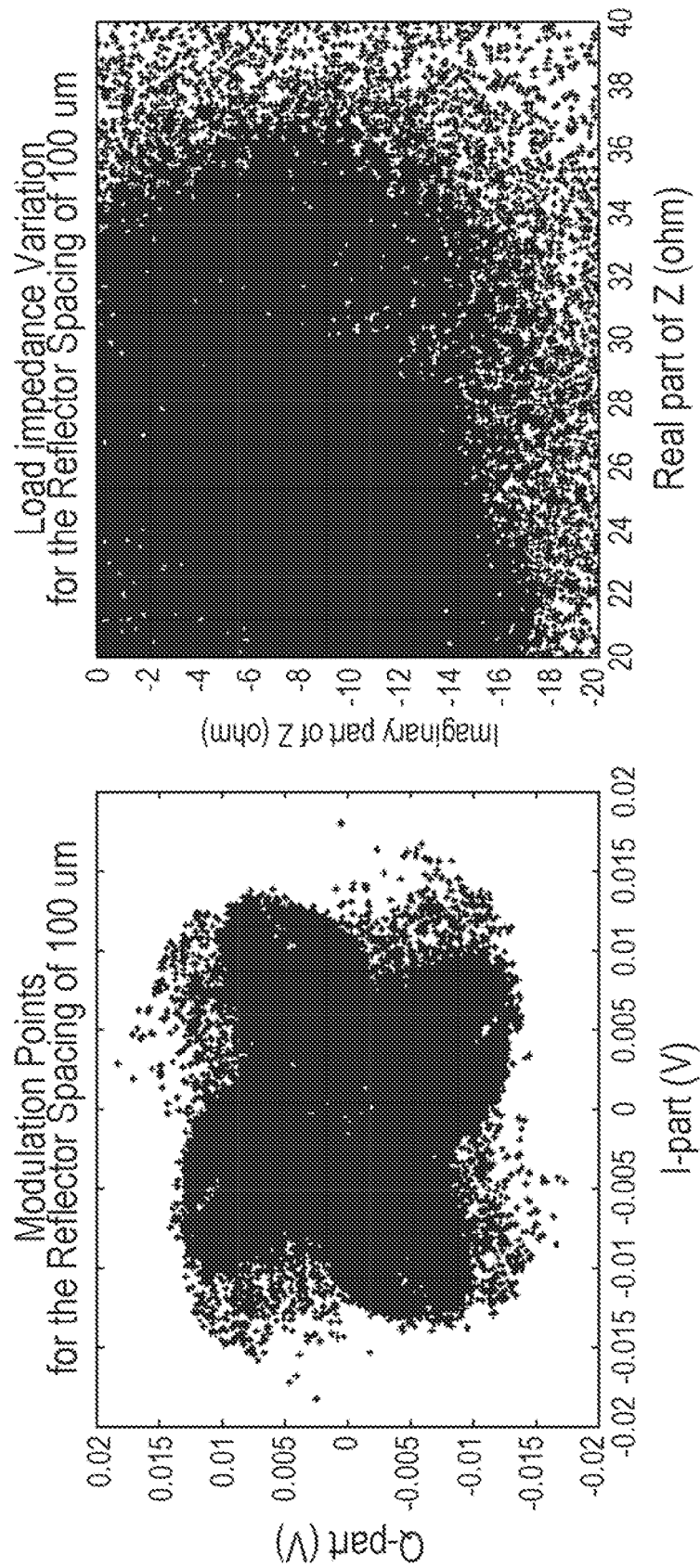
FIG. 24B shows a signal constellation for a 100 μm reflector spacing with quadrant selection performed before the antenna.
Figure 24C:
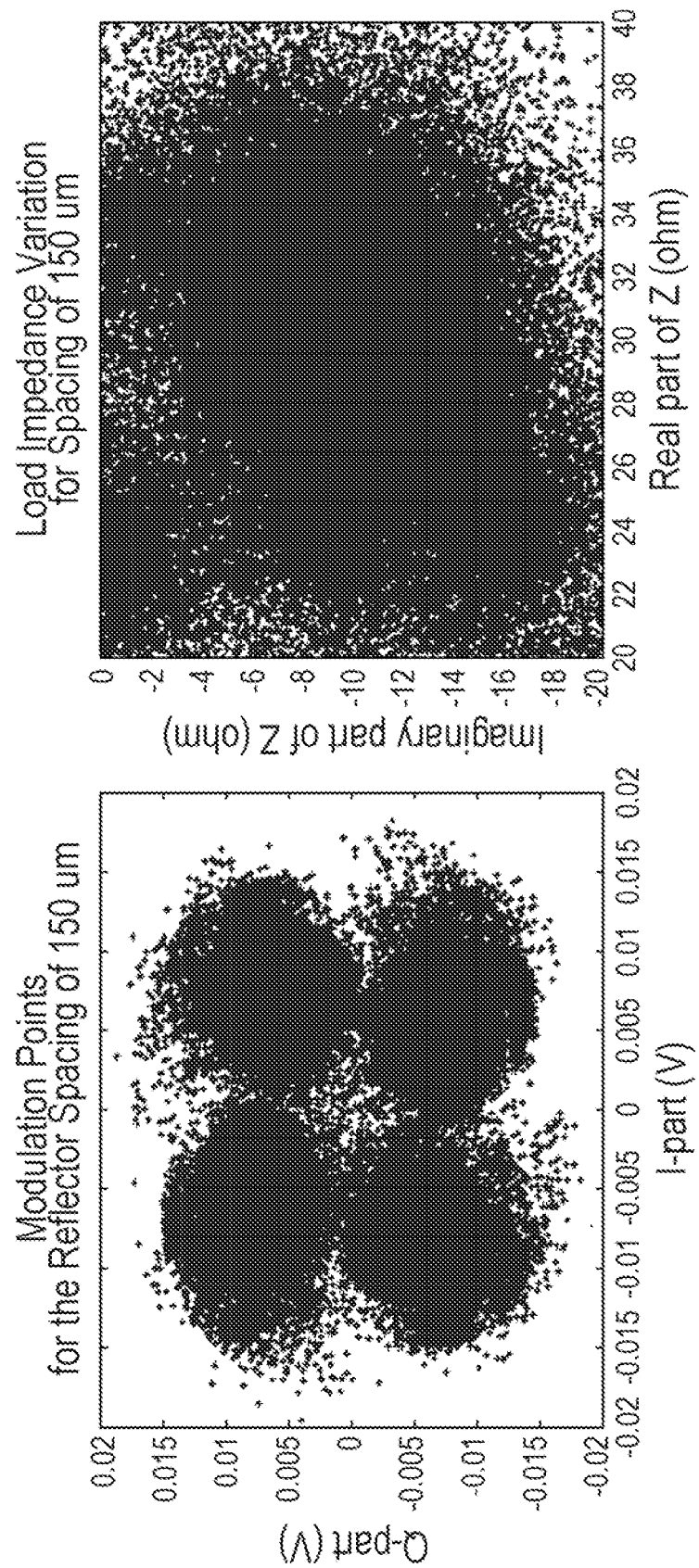
FIG. 24C shows a signal constellation for a 150 μm reflector spacing with quadrant selection performed before the antenna.
Figure 24D:
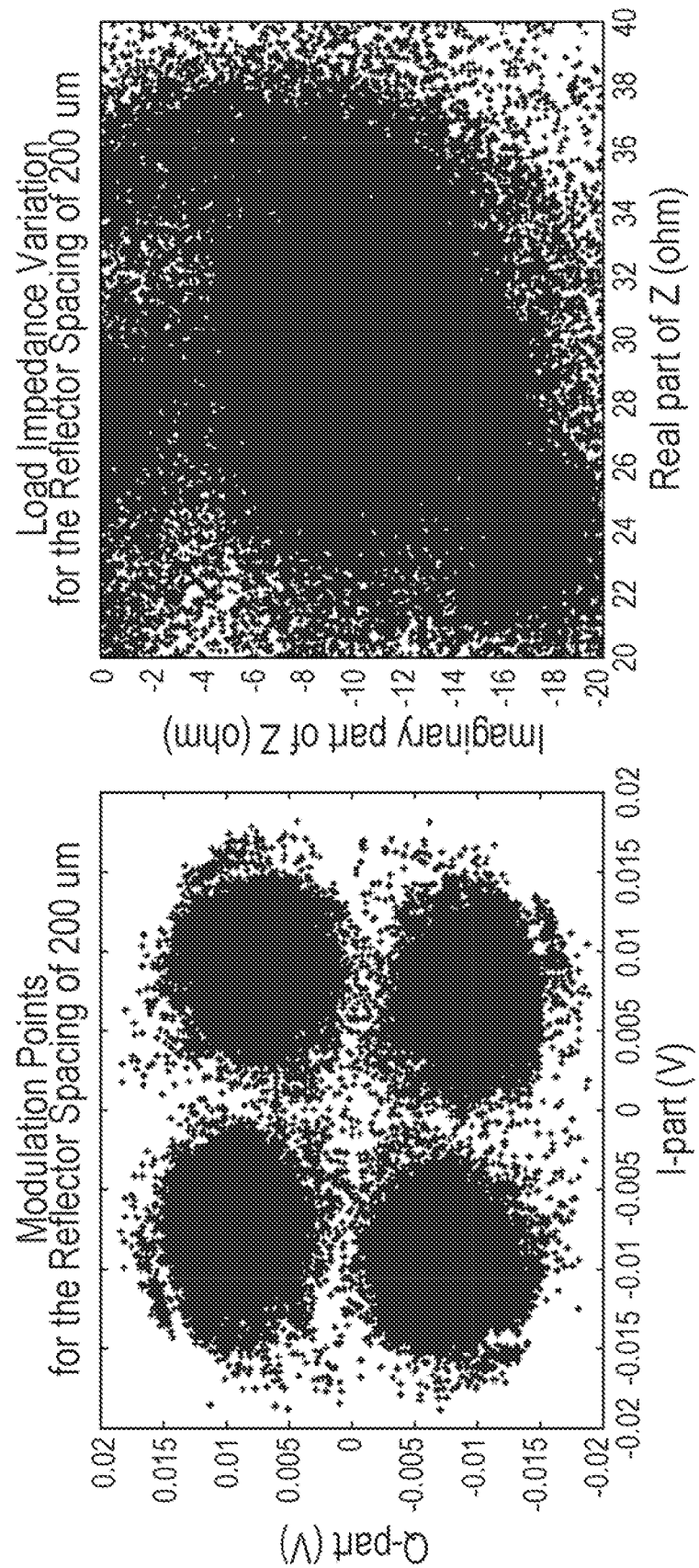
FIG. 24D shows a signal constellation for a 200 μm reflector spacing with quadrant selection performed before the antenna.

FIG. 24A to FIG. 24D show signal constellation simulations where five reflectors are used on either side of the driven elements (a dipole) with varying spacing. These simulations were performed for a case of air-silicon media having a resonant horizontal dipole on the boundary. In these examples quadrant selection was performed before the antenna. FIG. 24A shows a signal constellation for a 50 μm spacing. FIG. 24B shows a signal constellation for a 100 μm spacing. 100,000 iterations were used to generate the constellation of FIG. 24B from which 62,494 iterations satisfied the impedance requirement. FIG. 24C shows a signal constellation for 150 μm spacing. 100,000 iterations were used to generate the constellation of FIG. 24C from which 73,039 iterations satisfied the impedance requirement. FIG. 24D shows a signal constellation for 200 μm spacing. 100,000 iterations were used to generate the constellation of FIG. 24D from which 76,997 iterations satisfied the impedance requirement.

While the exemplary embodiments thus described herein show substantially parallel and perpendicular driven elements 104 and reflectors 102, there is no requirement for these elements to be so disposed. It is contemplated that other, non-orthogonal arrangements can be used as well. While the exemplary embodiments thus described herein show switches 103 in the reflector elements of antenna 101, it is also contemplated that one or more switches can also (or, in some cases alternatively) be added to the driven elements 104 to achieve modulation directionality.

Theoretical Modeling Discussion:

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

We now describe methods useful to determine desired reflector switch combinations in more detail. The following section describes how to the best of our current understanding, algorithms, such as written in a MATLAB code, can be used to efficiently find the switching combinations which result in a desired constellation point. Each switching combination can define a unique boundary condition around the main antenna driven elements. For every boundary condition, generally a separate Electromagnetic (EM) simulation has to be performed to recalculate the field values and the antenna parameters.

Figure 25:
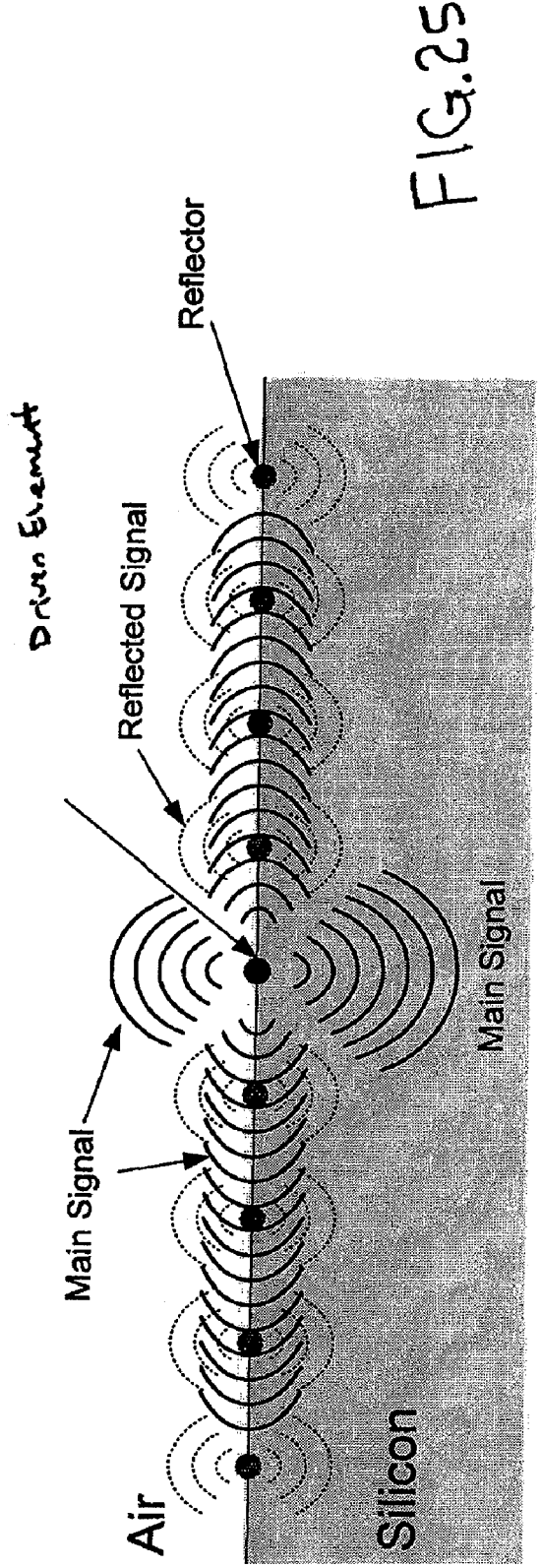
FIG. 25 shows a diagram of an exemplary antenna to be modeled.

FIG. 25 shows a diagram of an exemplary antenna to be modeled. Switches (not shown in FIG. 25) are situated on each reflector. For a total number of N switches on the reflectors, $2^N$ switch configurations exist. In one exemplary configuration, we used N=90, which provides $2^{90}$, or about $10^{27}$, switch combinations. Each switching combination defines a new EM problem with its unique boundary conditions. Conventional EM techniques are incapable of handling such a large number of combinations because of the simulation time that is required to solve each combination.

Figure 26:
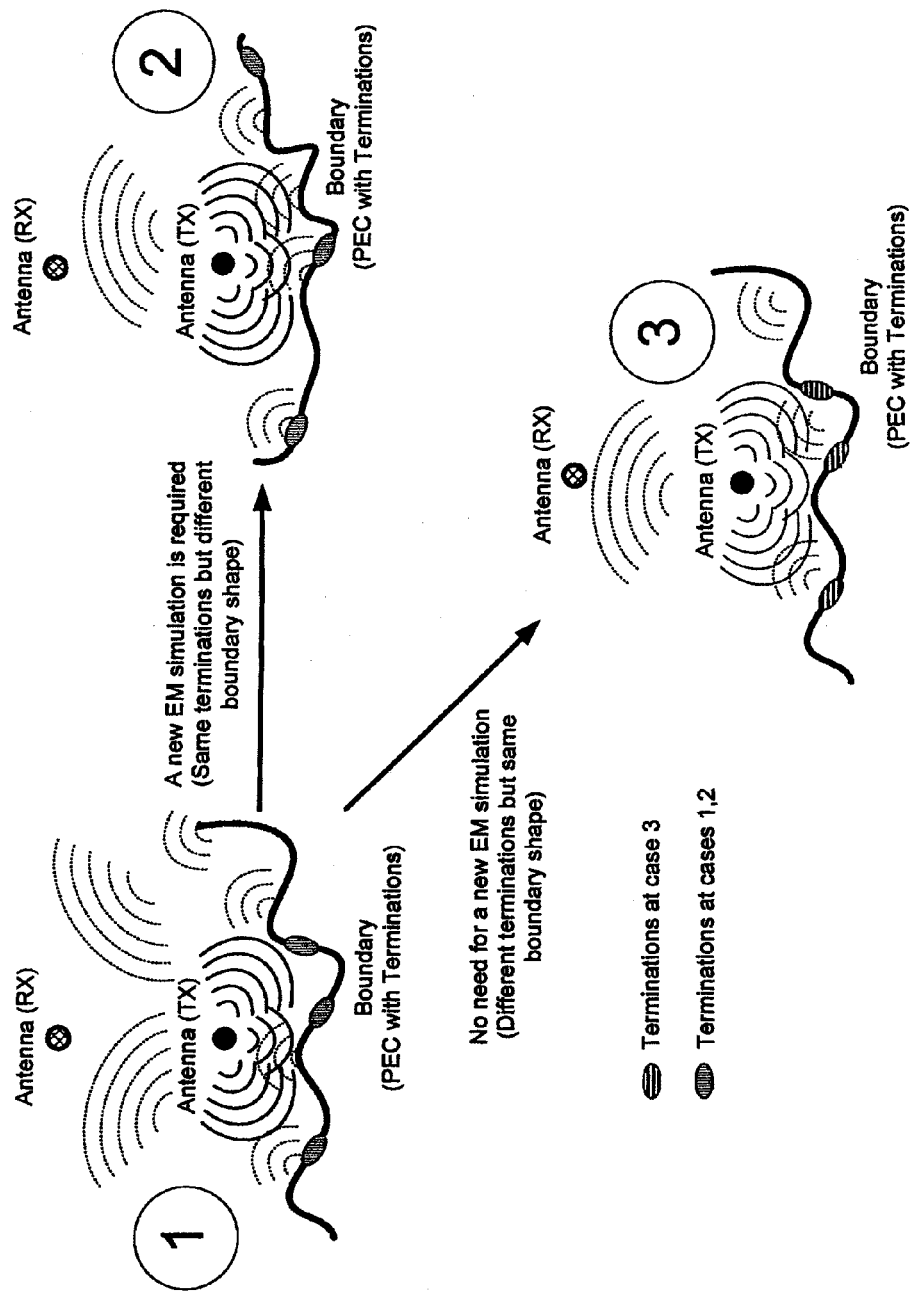
FIG. 26 shows a diagram of boundary conditions with termination impedances.

FIG. 26 shows a diagram of boundary conditions with termination impedances for an exemplary antenna. Configurations 1 and 3 have identical S-parameter matrices which are different from the matrix of configuration 2. We realized that where the shape of the boundary surface remains the same, but the termination impedances change, there is no need to perform a new EM simulation to calculate the field parameters. In the case, as illustrated in FIG. 26, differential local ports (voltage gaps) can be defined at the location of the switches and also for the receiving and transmitting antennas. Therefore, only a single EM simulation needs to be run to calculate the complete S-parameters of the system.

Figure 27:
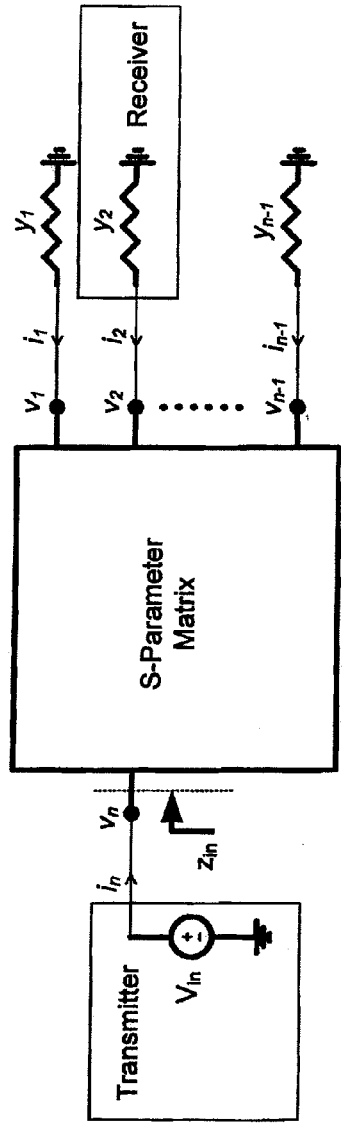
FIG. 27 shows a circuit model of the EM problem.

FIG. 27 shows a circuit model of the EM problem. As shown in FIG. 27, in the case of (N−2) switches and one transmitting antenna and one receiving antenna, a total number of N differential local ports need to be defined. The resulting S-parameter matrix contains N×N components. Also, as shown in FIG. 27, for any termination impedances, a circuit simulator or a MATLAB code can be used to extract the voltages and the currents at each single port. In our exemplary simulation we can model an open switch with a high impedance termination and a short switch with a low impedance termination and use a MATLAB code to calculate the voltages and the currents at each port.

Figure 28:
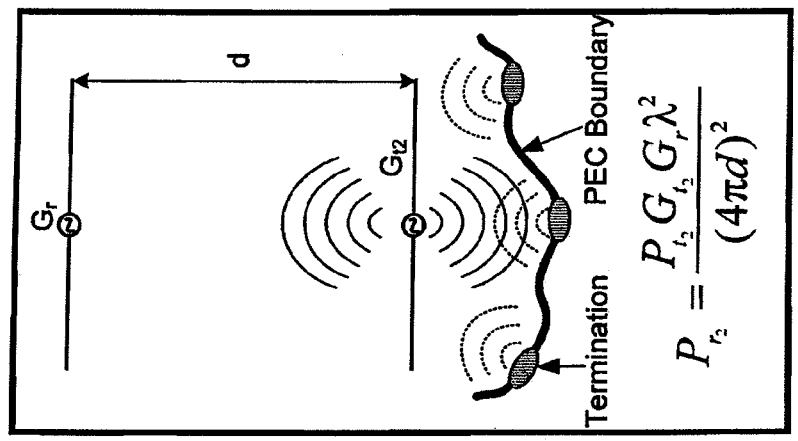
FIG. 28 shows an antenna gain calculation with circuit parameters.
Figure 28:
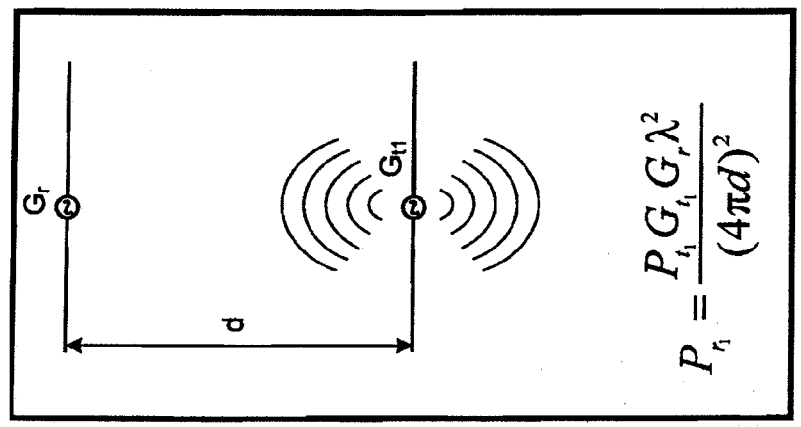

FIG. 28 shows an antenna gain calculation with circuit parameters. The termination impedances on the boundary surface affect the antenna gain. However, there is no need to run an EM simulation to calculate the new gain. As shown in FIG. 28, by knowing these voltages and currents, we can use the Friis transmission equation $$P_{r2} = P_{t2} G_{t2} G_r \lambda^2 / (16\pi^2 d^2)$$

to extract some of the antenna parameters, such as gain.

Figure 29:
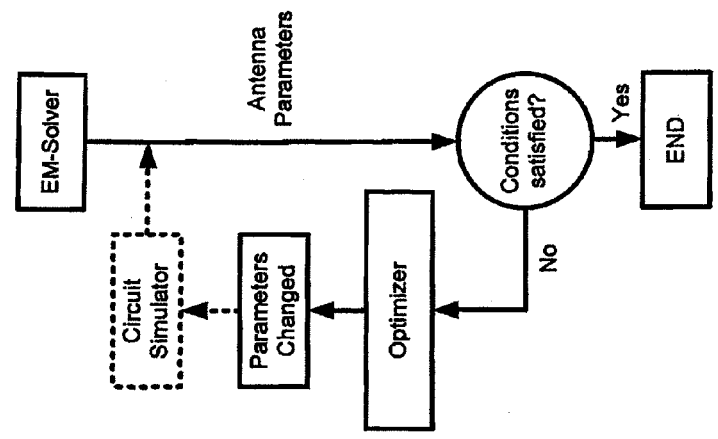
FIG. 29 shows a comparison of circuit-model based optimization techniques to conventional optimization techniques.
Figure 29:
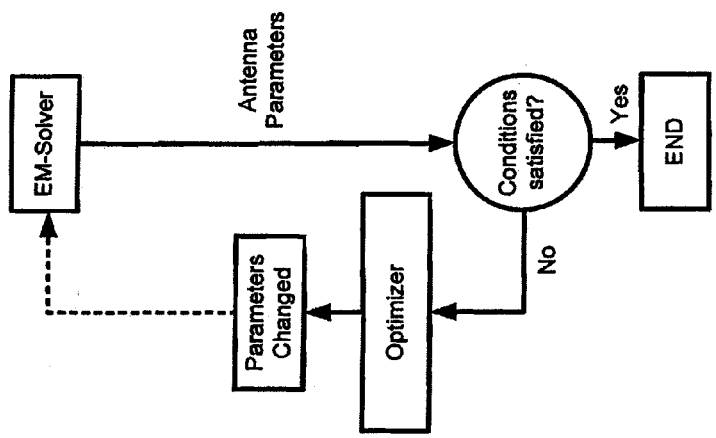

FIG. 29 shows a comparison of circuit-model based optimization techniques to conventional optimization techniques. Each step in the circuit-model based optimizer takes less than 10 milliseconds as compared to 10 minutes for the conventional method. The two flow charts of FIG. 29 compare the above described technique with a more conventional EM technique. Using conventional EM techniques, antenna parameters directly extracted from an EM simulation are used to check the optimization goals (here, the constellation points). In the case of unsatisfied conditions, an optimizer can be used to change the parameters and to send them to the "EM solver," for example IE3D. In one embodiment of the present method, the optimizer changes the parameters (switching combinations), and sends them to a circuit simulator, or other suitable code, such as a MATLAB code, to calculate the resulting constellation point without the need to go through an EM solver. As shown in FIG. 29 each loop in the present circuit-model based technique takes no more than 10 milliseconds, and it is contemplated that such calculations could be done even more quickly. By contrast, in conventional methods it takes about 10 minutes to perform the equivalent computation. IE3D uses a Moment-based algorithm to calculate the fields. In our simulations the switching combinations were then searched "randomly" to find a desired constellation point.

Figure 30:
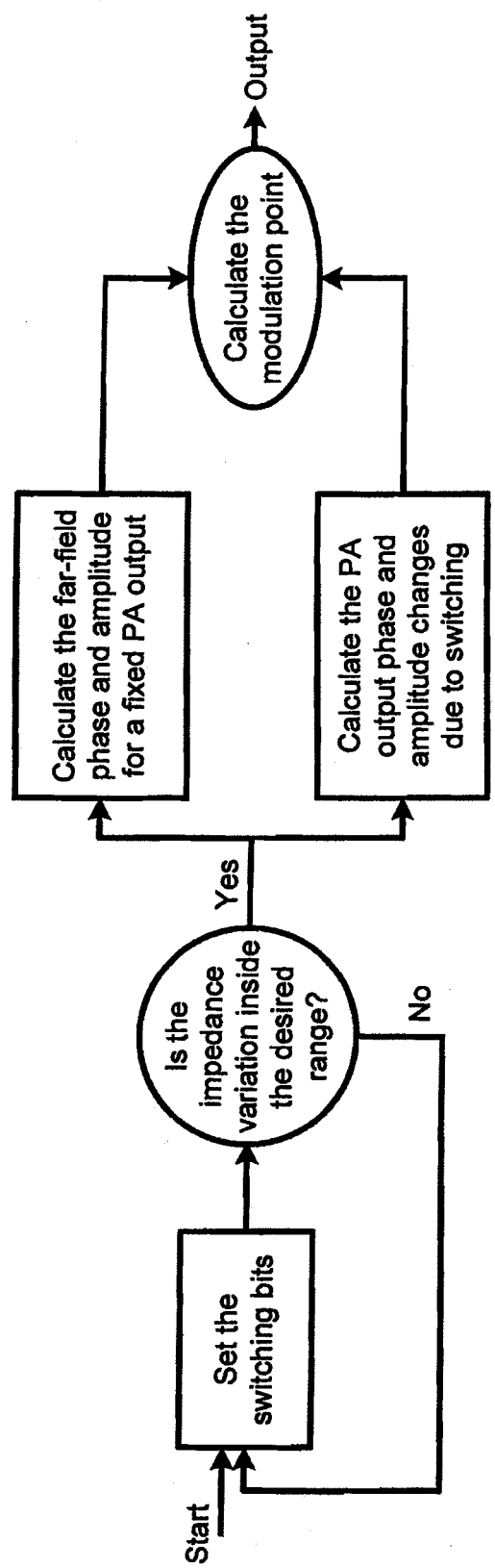
FIG. 30 shows a flow chart of a method of modulation point extraction.

FIG. 30 shows a flow chart of a method of modulation point extraction where the PA output voltage variation is further considered when calculating the modulation points.

Figure 31A:
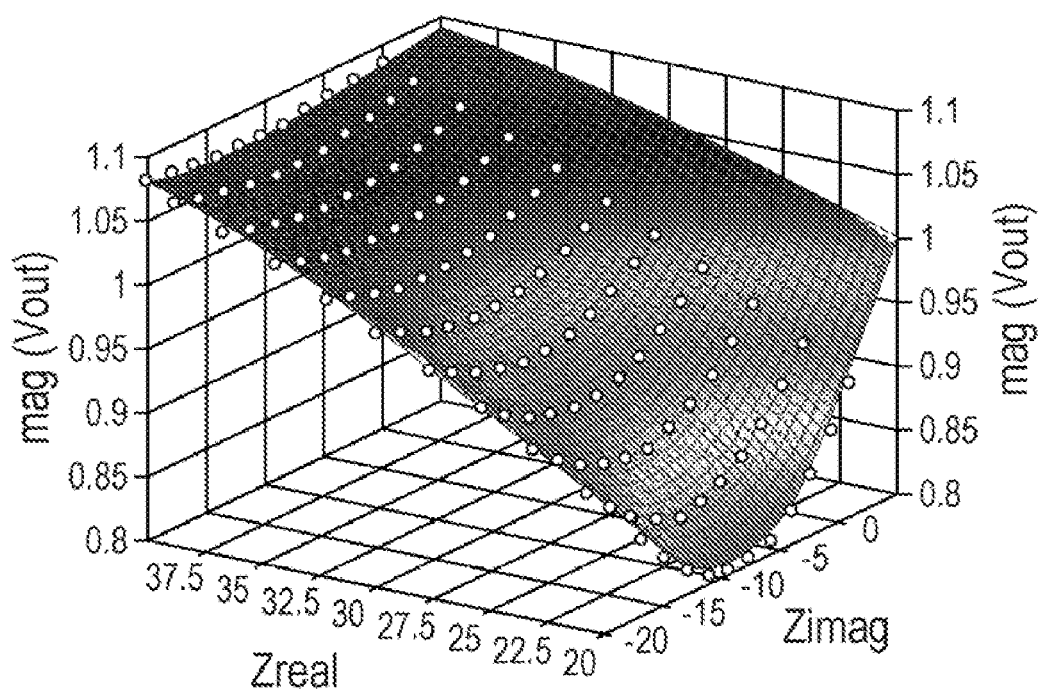
FIG. 31A shows a 3 dimensional ("3D") plot of the magnitude of PA performance variation.
Figure 31B:
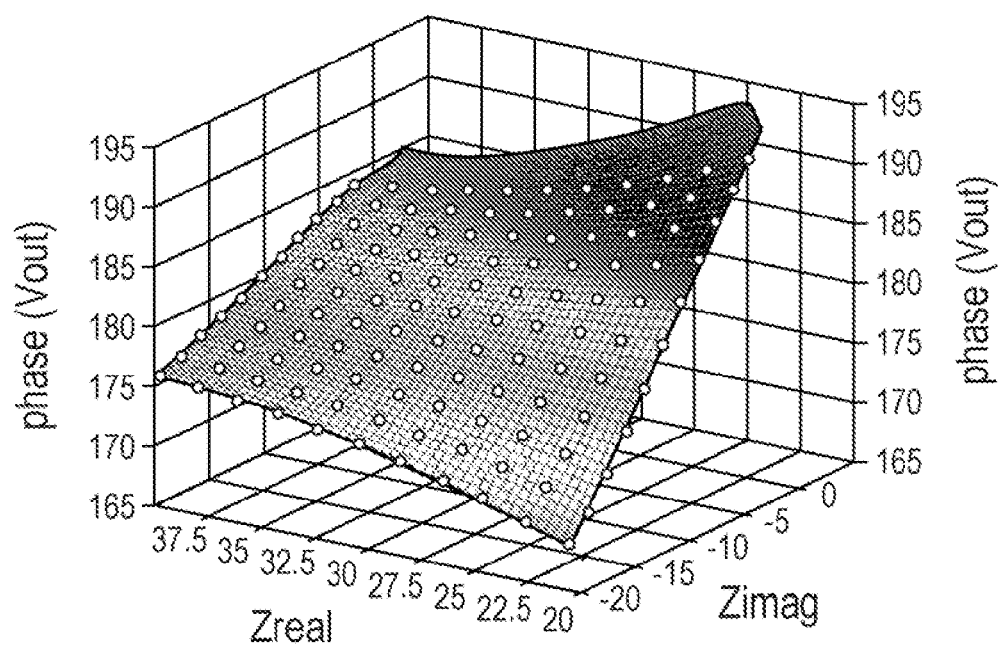
FIG. 31B shows a 3D plot of the phase corresponding to the magnitude plot of FIG. 31A.
Figure 31C:
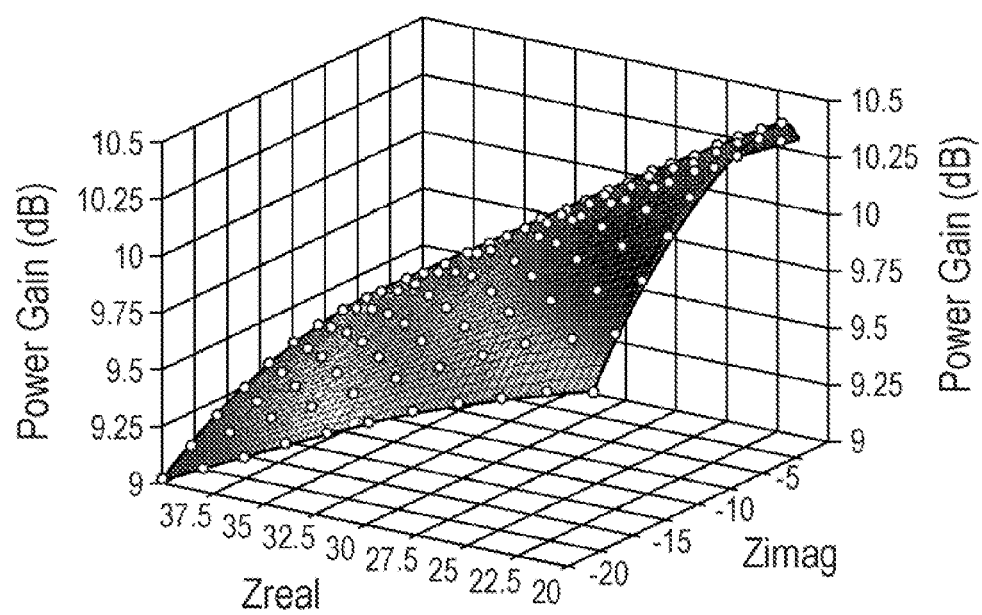
FIG. 31C show a 3D plot of Power Gain in dB.
Figure 31D:
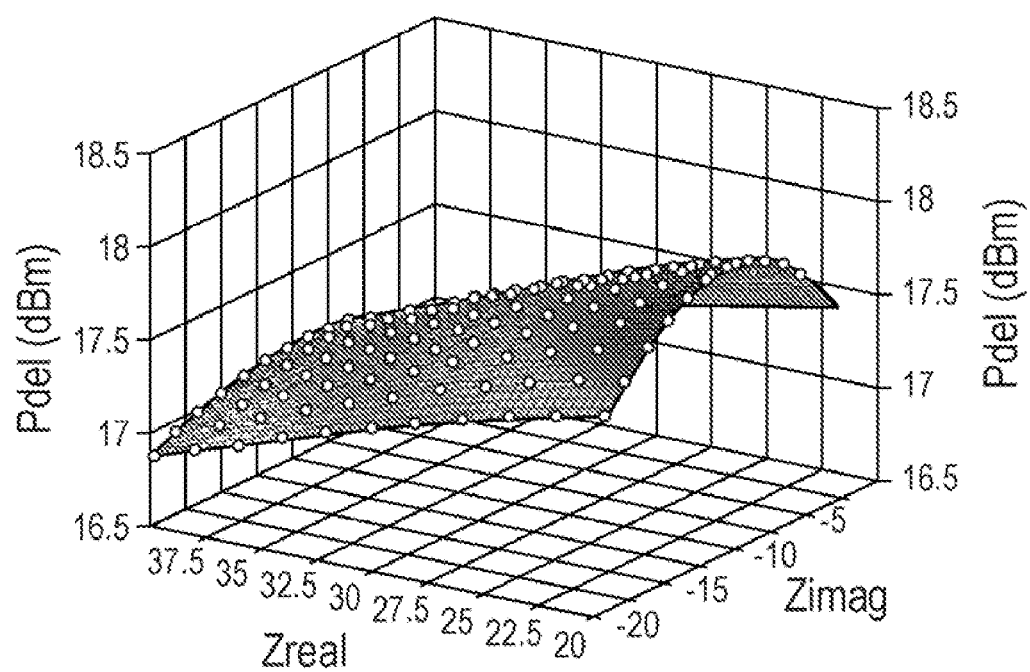
FIG. 31D shows a 3D plot of power delivered in dBm.
Figure 31E:
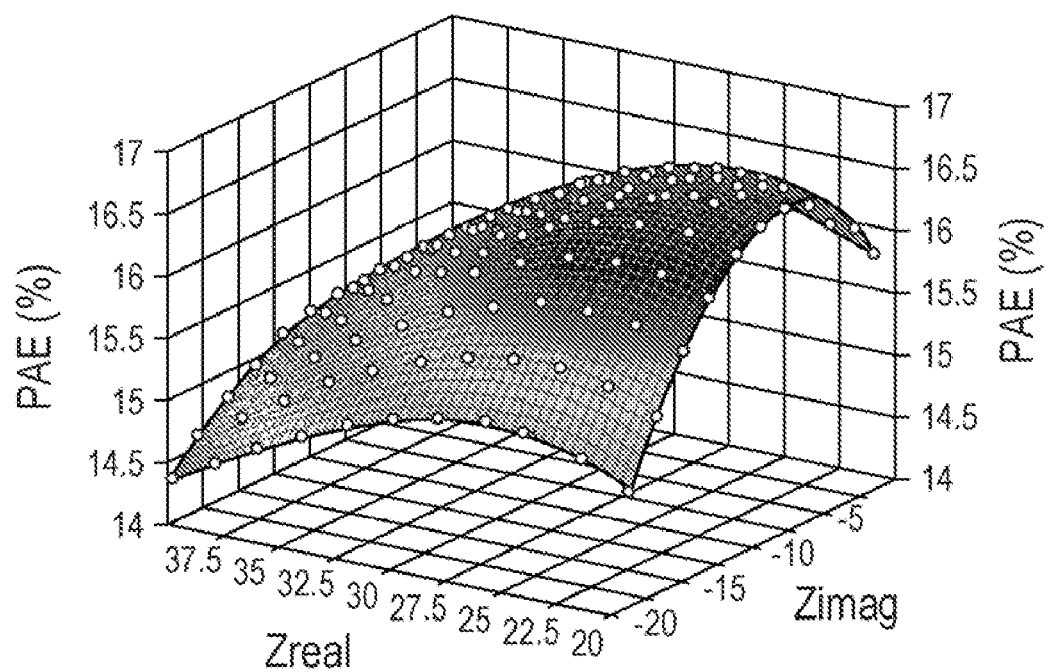
FIG. 31E shows a 3D plot of power added efficiency.

FIG. 31A shows a 3 dimensional ("3D") plot of the magnitude of PA performance variation where antenna parasitic switching changes the load impedance and consequently affects the PA performance. Curve fitting was used to extract a proper function which expresses the PA parameters in terms of the load impedance. FIG. 31B shows a 3D plot of the phase corresponding to the magnitude plot of FIG. 31A. FIG. 31C show a 3D plot of Power Gain in dB. It can be seen in FIG. 31C that the gain variation is less than 1.5 dB across the impedance variations. FIG. 31D shows a 3D plot of the power delivered in dBm. It can be seen in FIG. 31D that the delivered power varies no more than 2 dBm. FIG. 31E shows a 3D plot of the power added efficiency which changes from 14% to 17% over the plotted region.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A radio transmitter for transmitting a modulated signal comprising:
   a radio carrier source that generates a radio carrier signal, the radio carrier source powered by an electrical power source; and
   an antenna including at least one driven element and at least one reflector element, the driven element electrically coupled to the radio carrier source, at least one of the driven elements or said at least one reflector element including at least one switch, wherein the radio transmitter is configured to transmit a signal having a first modulation state in response to an open state of said at least one switch and is configured to transmit a signal having a second modulation state in response to a closed state of said at least one switch;
said transmitter configured to transmit said signal in a solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

2. The transmitter of claim 1, wherein the radio carrier source further includes a power amplifier, the power amplifier electrically coupled between said radio carrier source and said antenna.

3. The transmitter of claim 1, wherein the transmitted modulated radio signal comprises multiple solid angles within which information is transmitted with an error rate low enough to allow demodulation to recover a baseband signal, and outside of which solid angles sufficient power is transmitted but said information is transmitted with an error rate that is not low enough to allow demodulation to recover said baseband signal.

4. The transmitter of claim 3, wherein the transmitter is configured to transmit the same baseband modulation within said multiple solid angles within which information is transmitted with an error rate low enough to allow demodulation to recover a baseband signal, and outside of which solid angles sufficient power is transmitted but said information is transmitted with an error rate that is not low enough to allow demodulation to recover said baseband signal.

5. The transmitter of claim 3, wherein the transmitter is configured to transmit a first baseband modulation within a first one of said multiple solid angles within which information is transmitted with an error rate low enough to allow demodulation to recover a baseband signal, and outside of which solid angles sufficient power is transmitted but said information is transmitted with an error rate that is not low enough to allow demodulation to recover said baseband signal and to transmit a second baseband modulation within a second one of said multiple solid angles within which information is transmitted with an error rate low enough to allow demodulation to recover a baseband signal, and outside of which solid angles sufficient power is transmitted but said information is transmitted with an error rate that is not low enough to allow demodulation to recover said baseband signal.

6. The transmitter of claim 3, wherein the digital modulating signal comprises a digital modulation selected from the group of digital modulation schemes consisting of m-QAM, m-PSK, PAM-PSK, Multi-amplitude continuous phase modulation ("CPM"), and CPFSK.

7. The transmitter of claim 1, wherein a transmission situated within the solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal comprises a secure communication.

8. The transmitter of claim 1, wherein a modulation constellation corresponding to a digital modulating signal comprises a transmission with a symbol error rate that is substantially near zero within said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

9. The transmitter of claim 1, wherein a plurality of reflector switches are configured to provide a plurality of reflector switch combinations that determine said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

10. The transmitter of claim 1, wherein a plurality of reflector switches are configured to provide a plurality of reflector switch combinations that determine a constellation of points within said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

11. The transmitter of claim 1, wherein a first plurality of reflector switches are configured to provide a first plurality of reflector switch combinations that determine said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal and wherein a second plurality of reflector switches are configured to provide a second plurality of reflector switch combinations that also determine said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

12. The transmitter of claim 11, wherein said first plurality of reflector switch combinations and said second plurality of reflector switch combinations are configured to provide a first set of corrupted modulation points outside of said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal and a second set of corrupted modulation points outside of said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal, said first set of corrupted modulation points different from said second set of corrupted modulation points.

13. The transmitter of claim 1, wherein said at least one switch comprises a transistor and an inductor, said inductor configured to resonate with a parasitic capacitance of said transistor when said switch is off.

14. The transmitter of claim 1, wherein said at least one switch comprises a MEMS switch.

15. A phased array antenna comprising a plurality of transmitters according to claim 1, wherein a substantial portion of the transmitted power is situated within one or more solid angles within which information is transmitted with an error rate low enough to allow demodulation to recover a baseband signal, and outside of which solid angles sufficient power is transmitted but said information is transmitted with an error rate that is not low enough to allow demodulation to recover said baseband signal.

16. The transmitter of claim 1, wherein the antenna further comprises at least one hemispherical lens.

17. The transmitter of claim 1, wherein the transmitter comprises an integrated structure fabricated on a substrate.

18. The transmitter of claim 17, wherein the transmitter structure comprises SiGe.

19. The transmitter of claim 1, further comprising at least one mixer before the antenna.

20. The transmitter of claim 1, wherein an angular extent of said solid angle is dependent upon a polarization plane of said transmitter.

21. A method for modulating a radio signal comprising the steps of:
    providing a carrier signal;
    providing a modulation signal;
    providing an antenna including at least one driven element and a plurality of reflectors, at least some of the reflectors including at least one reflector switch;
    delivering said carrier signal to said at least one driven element;
    transmitting said carrier signal from said driven element; and
    causing the transmitted carrier signal to be modulated by said modulation signal in response to switching said at least one reflector switch;
    said signal being transmitted having a solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

22. A method for selecting desirable antenna reflector switch combinations, comprising the steps of:
    a. providing a plurality of antenna reflectors, each antenna reflector including at least one of a plurality of reflector switches, each reflector switch capable of having an open position and a closed position;
    b. randomly generating a set of reflector switch positions to be applied to said plurality of reflector switches as a combination;
    c. performing a mathematical simulation to determine whether the combination of reflector switch positions generated in step b results in a modulated signal that can be demodulated within a solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal; and
    d. repeating steps b and c until a desired number of combinations are found that result in a modulated signal that can be demodulated within said solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

23. The method of claim 22, wherein the step of performing a mathematical simulation comprises performing a mathematical simulation to determine whether said set of reflector switch positions provides a modulated signal that can be demodulated within a solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal and within a radius of a particular point on a digital modulation constellation.

24. The method of claim 23, wherein repeating steps b and c comprises repeating steps b and c until a desired number of combinations for each point on the digital modulation constellation is found.

25. The method of claim 22, wherein the step c of performing a mathematical simulation comprises performing a circuit analysis mathematical simulation to determine if the set of reflector switch positions provides a modulated signal that can be demodulated within a solid angle within which information is transmitted with an error rate low enough to allow demodulation to recover a baseband signal, and outside of which solid angle sufficient power is transmitted but said information is transmitted with an error rate that is not low enough to allow demodulation to recover said baseband signal.

26. The method of claim 22, further comprising as a step between step b and step c the step of performing once an S-Parameter extraction using an electromagnetic field mathematical simulation, followed by repeating steps b and c, using a circuit analysis mathematical simulation in step c.

* * * * *